George E. Atwood
Charles H. Curtis
INVENTORS

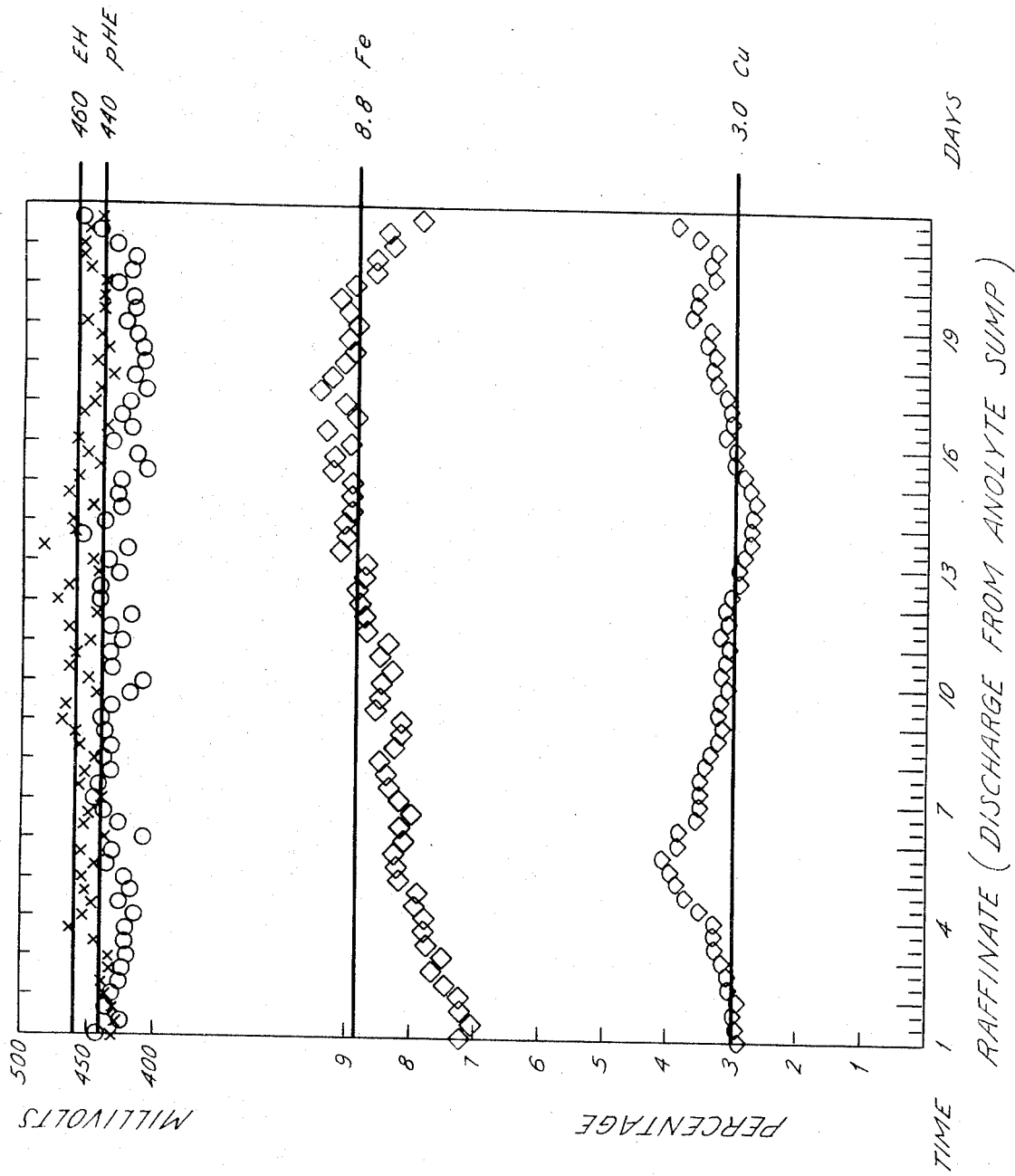

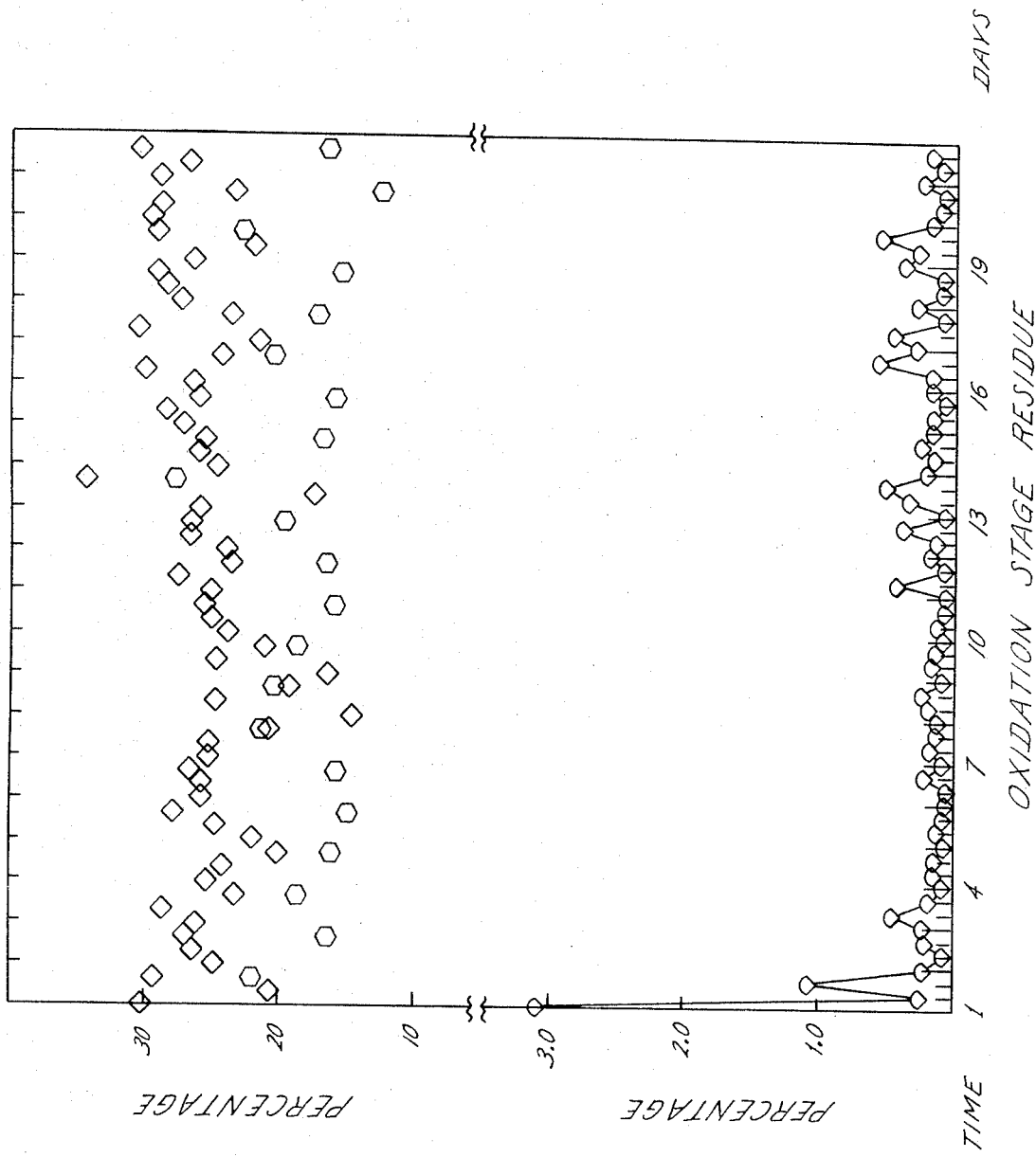

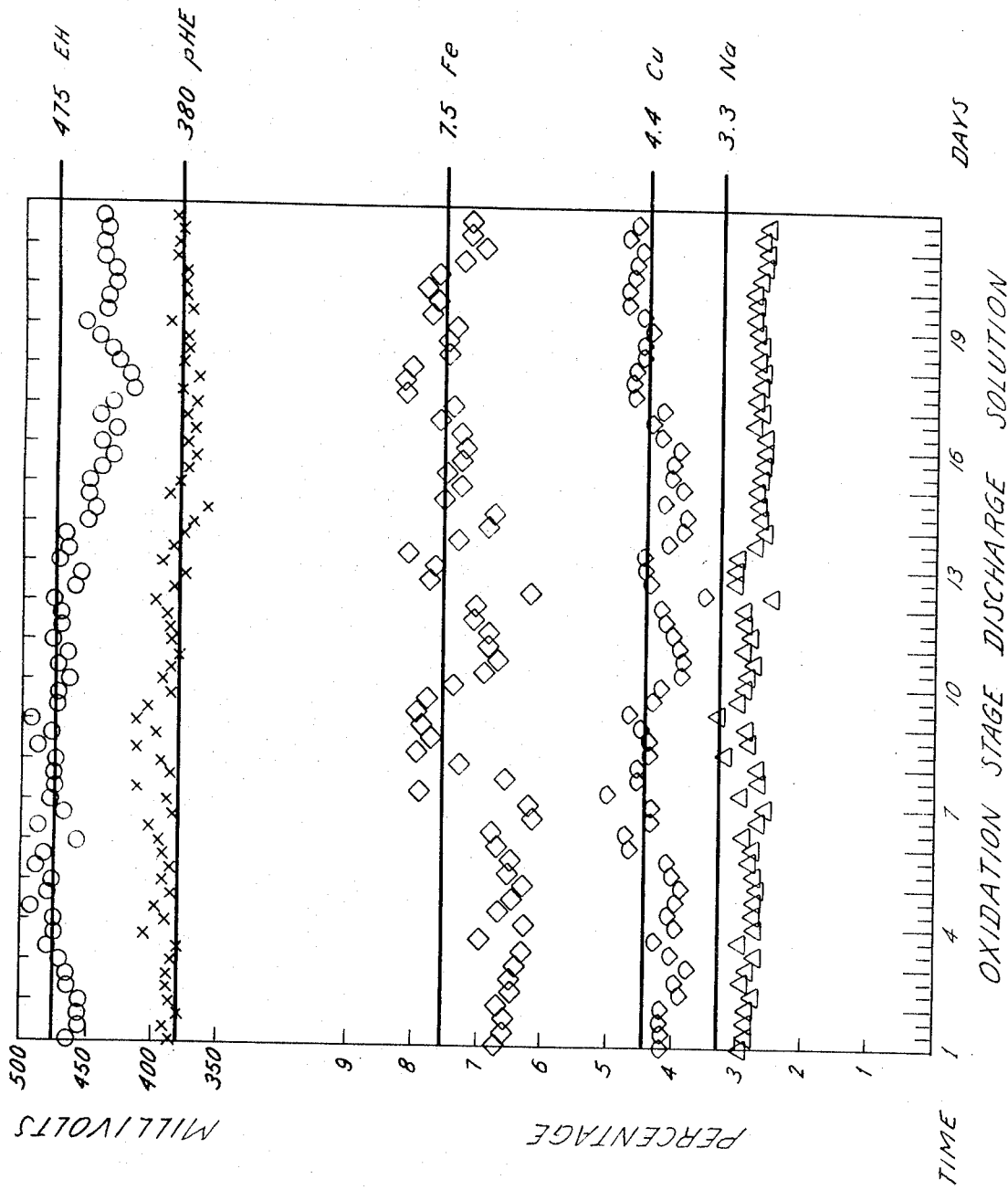

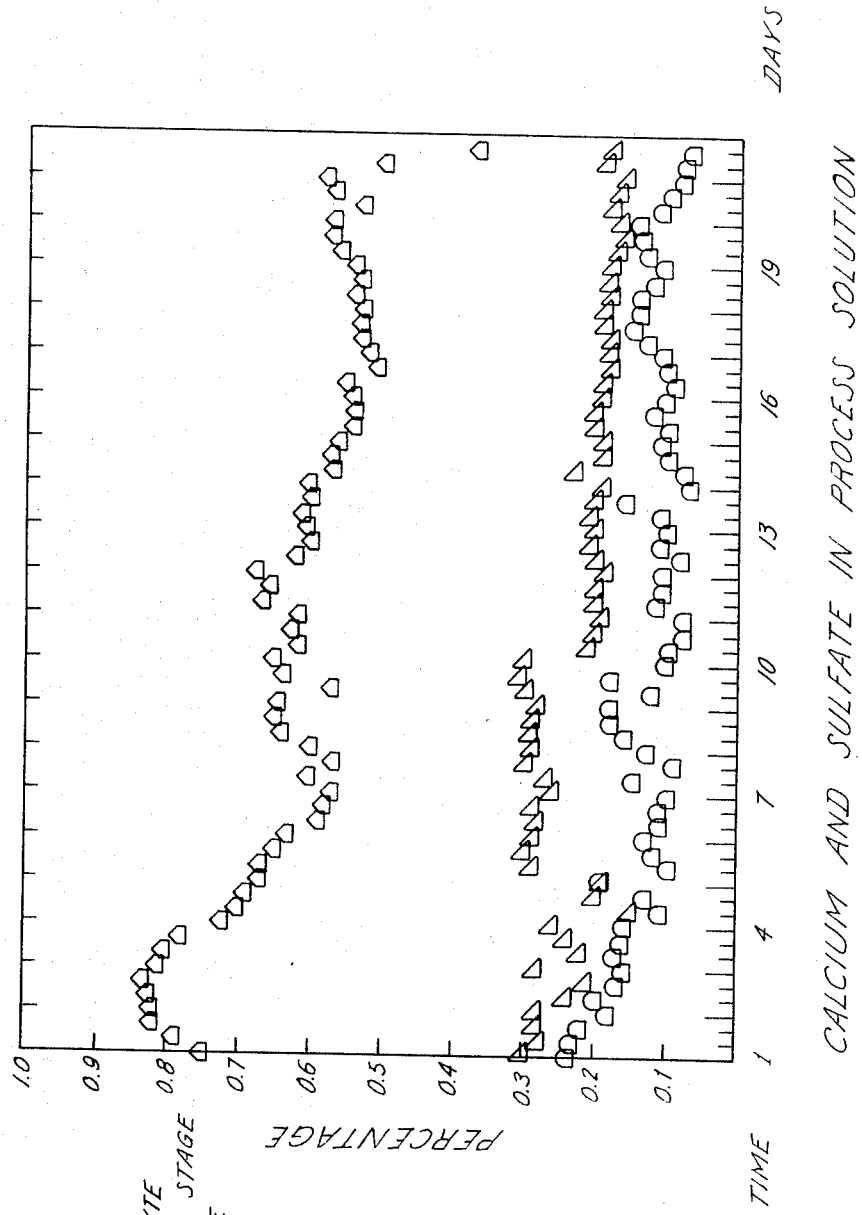

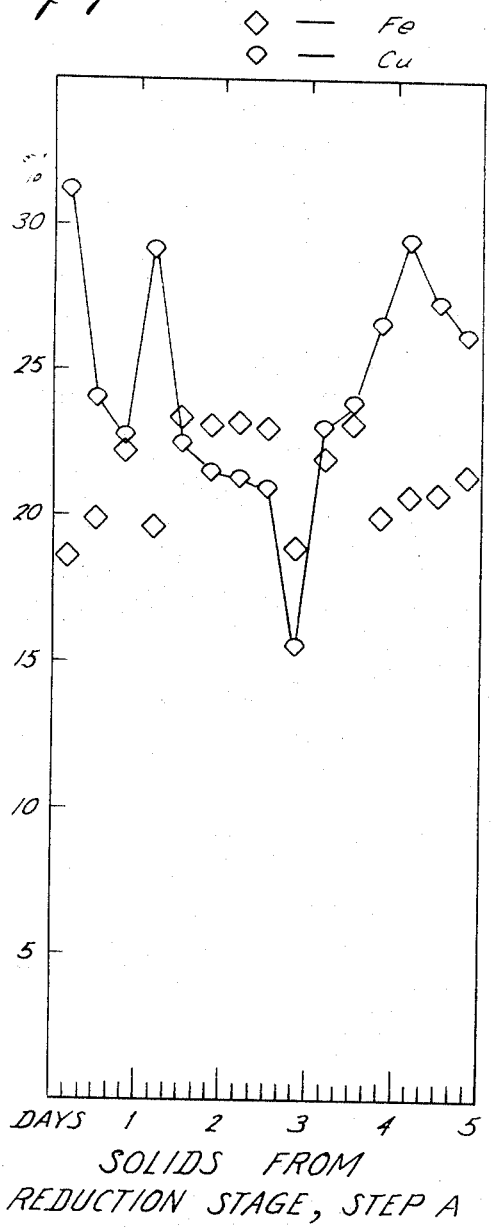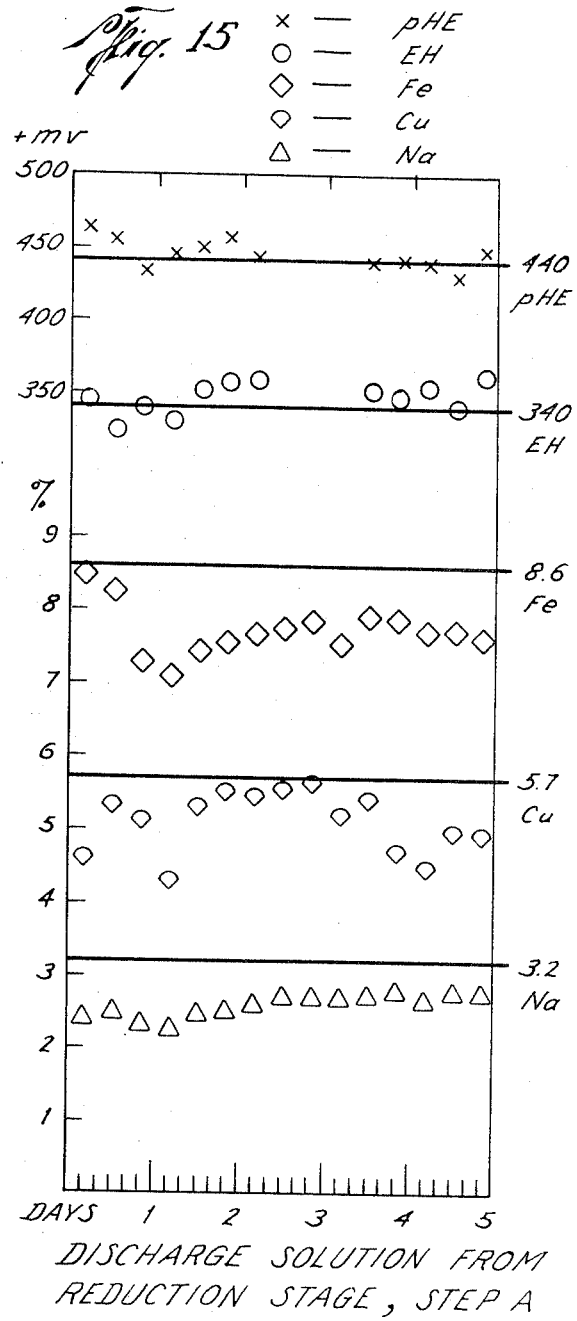

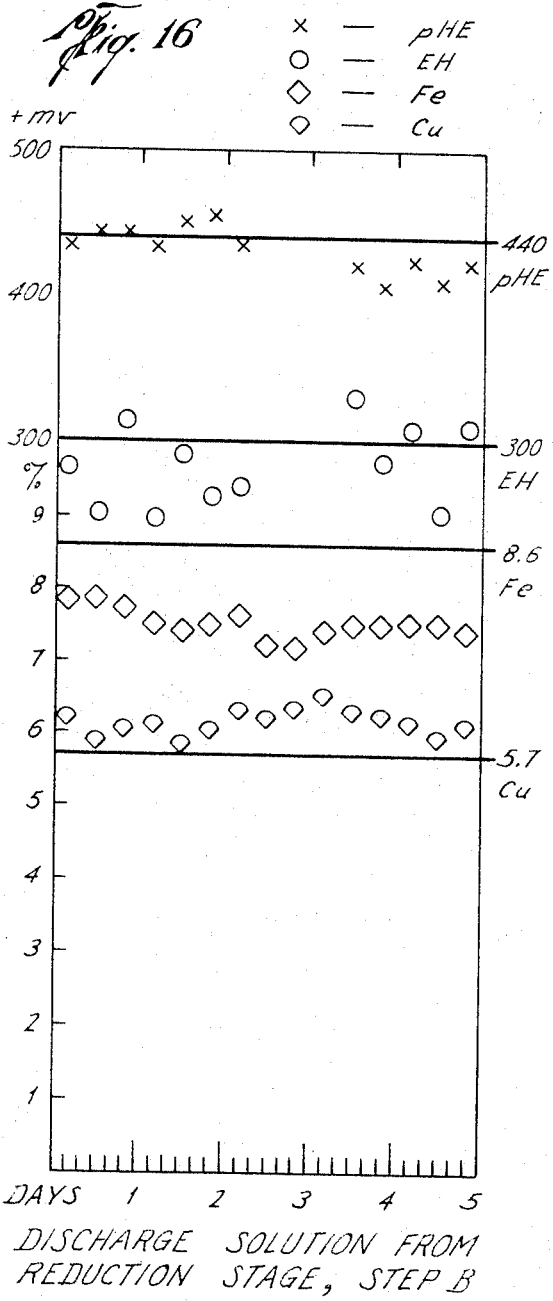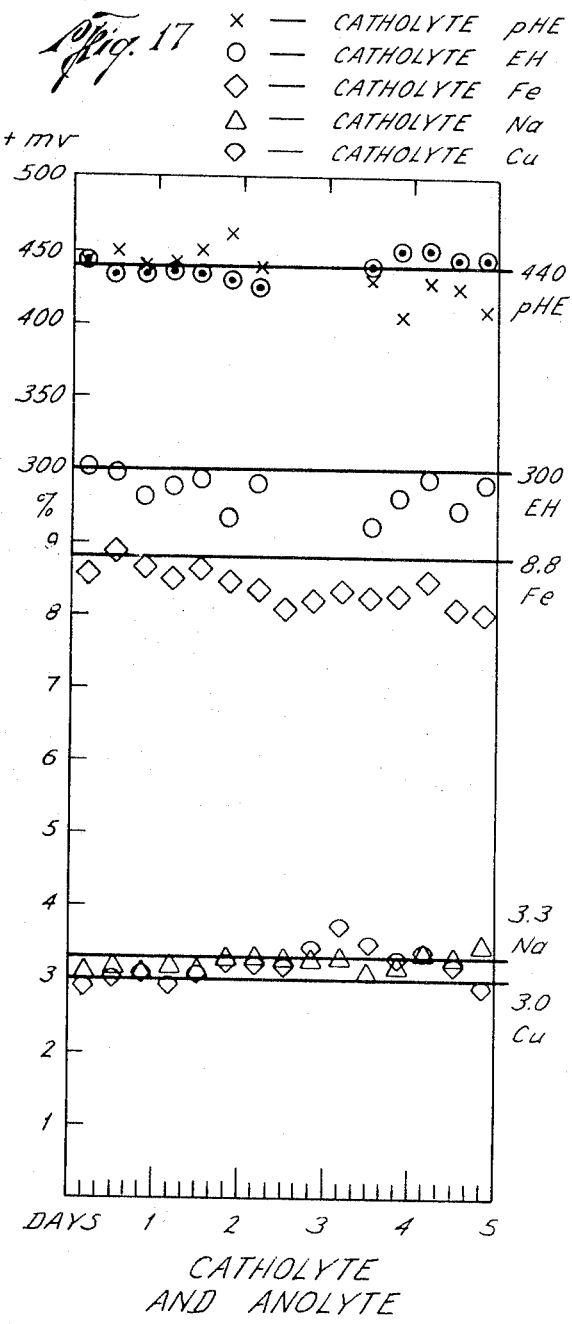
Fig. 16 — DISCHARGE SOLUTION FROM REDUCTION STAGE, STEP B
Fig. 17 — CATHOLYTE AND ANOLYTE
George E. Atwood
Charles H. Curtis
INVENTORS
BY
ATTORNEY

RAFFINATE (DISCHARGE FROM ANOLYTE SUMP)

OXIDATION STAGE RESIDUE

George E. Atwood
Charles H. Curtis
INVENTORS

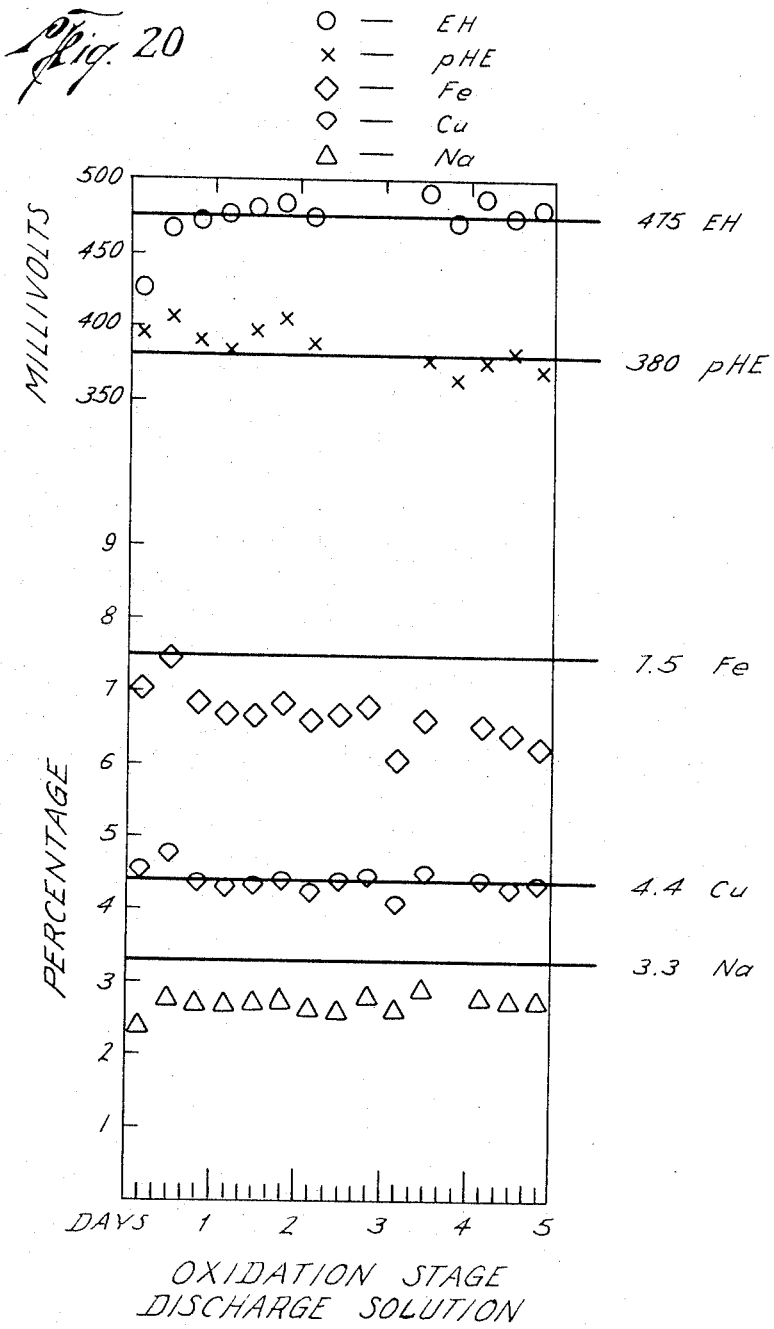

United States Patent Office 3,785,944
Patented Jan. 15, 1974

3,785,944
HYDROMETALLURGICAL PROCESS FOR THE PRODUCTION OF COPPER
George E. Atwood and Charles H. Curtis, Tucson, Ariz., assignors to Duval Corporation, Houston, Tex.
Filed Oct. 7, 1971, Ser. No. 187,393
Int. Cl. C22b 15/08; C22d 1/16
U.S. Cl. 204—107
36 Claims

ABSTRACT OF THE DISCLOSURE

A hydrometallurgical process for pollution-free recovery of metallic copper from chalcopyrite and other copper-containing materials by (a) ferric chloride oxidation thereof to produce cupric chloride, (b) reduction of the cupric chloride to cuprous chloride, (c) recovery of metallic copper, preferably by electrolysis, and (d) regeneration of the ferric chloride by oxidation with concurrent purge of excess iron as well as sulfate ions and other impurities. The process is amenable to steady state cyclic operation, and stages (d) and (a) may advantageously be combined.

BACKGROUND OF THE INVENTION

(1) Field of the invention

This invention relates generally to a hydrometallurgical process for the production of metallic copper from copper-containing materials. In particular, this invention is concerned with the processing of copper sulfide ore concentrates to avoid the air pollution problems inherent in the processing of such materials by conventional pyrometallurgical methods. In accordance with this invention, electrolytic-grade metallic copper is produced after processing the copper-containing materials with solutions containing metal chlorides.

(2) Prior art

The copper industry is finding it very difficult to meet the air pollution regulations and standards promulgated by federal and state agencies within the last few years. The use of conventional pyrometallurgical processes in the production of metallic copper from copper ore concentrates results in the emission of suspended particulate matter and sulfur oxides. Of these air contaminants, it has been found that sulfur oxides are much more difficult to control.

Sulfur oxide emissions result from the smelting of sulfur-bearing materials. Although copper exists in various other forms in nature, such as native copper and copper oxides, carbonates and silicates, the primary sources of copper exist as low-grade deposits of copper sulfide ores in which the principal copper mineral is chalcopyrite, and which in most instances also contain some iron sulfide.

In an effort to comply with sulfur oxide air pollution regulations, copper companies have initiated research programs to develop methods for recovering the sulfur oxides being emitted from copper smelters. So far, however, no economical method for reducing sulfur oxide emissions to acceptable levels has been reported.

While the copper industry is making an all-out effort to develop an economical method to control sulfur oxide emissions so as to comply with present regulations and standards, there is an ever-increasing demand from the public for further improvement in the quality of the nation's atmosphere. This is resulting in the promulgation of even more restrictive regulations and standards. The continuation of this trend of more restrictive standards may eventually result in the copper producers finding it economically unfeasible, if not technically impossible, to comply with these standards.

Most proposed methods for controlling sulfur dioxide, the major sulfur oxide contaminant, contemplate the conversion of sulfur dioxide to sulfuric acid. However, even if an economically feasible method is found for converting substantially all the sulfur dioxide to sulfuric acid, the disposal of large amounts of sulfuric acid presents another pollution problem.

Instead of trying to control the emissions of air contaminants, such as sulfur dioxide, once they are formed, hydrometallurgy offers an alternative approach by avoiding the formation of the air contaminants. It has been recognized for some time that in the leaching of copper sulfide minerals, the sulfur can be recovered in solid elemental form. This is in contrast to present pyrometallurgical processes where the sulfur is removed by oxidizing the minerals at elevated temperatures, thereby forming sulfur oxides.

Besides producing only a minimal amount of gaseous and liquid wastes, a hydrometallurgical process to be economically competitive with conventional pyrometallurgical processes must provide for essentially complete recovery of all the copper in the materials being processed. This means that there must be essentially complete decomposition of the copper minerals to allow all the copper to go into solution for subsequent recovery. It is also desired that the rate of dissolution be acceptably rapid. In addition, the use of moderate temperatures and pressures is preferred to avoid high capital and operating costs.

The production of an electrolytic grade of metallic copper is another desirable characteristic of any commercial hydrometallurgical process.

The removal of iron and other impurities from the process solution is a requirement for a commercial hydrometallurgical process. The failure to remove the impurities in the process system will eventually result in the contamination of the copper product and the impairment of the dissolution reaction. In the same regard, the rate of production of by-products, such as sulfates resulting from the oxidation of sulfur, must be limited to the rate at which their removal can be practically accomplished.

A further desirable characteristic of a commercial hydrometallurgical process is the regeneration of the reagents.

Additionally, the process should include means for the recovery of precious metals, when present.

Although the above requirements or desirable characteristics of commercial hydrometallurgical processes have long been recognized, their achievement to the extent necessary for the development of a commercially feasible process has eluded the prior art. Initial efforts to develop methods for chemically treating copper ores were commenced by the British and Germans over one hundred years ago. Attempts to develop commercial processes utilizing metal chlorides, such as ferric chloride and/or cupric chloride, as the lixiviant are disclosed in Parnell, British Pat. No. 2,715 (1882); Seegall, U.S. Pat. No. 415,738 (1889); Hoepfner, U.S. Pat. No. 507,130 (1893); and Butterfield, British Pat. No. 9,052 (1895).

Work on the development of commercial hydrometallurgical processes did not begin in the United States until about the turn of the present century. Patents disclosing some of the efforts to develop commercial processes utilizing ferric chloride as the lixiviant are: McKay, Pat. No. 1,011,459 (1911); Baxeres, Pat. No. 1,041,407 (1912); David, Pat. No. 1,075,093 (1913); and Anderson Pat. No. 1,263,727 (1918).

One effort to overcome the problems of early hydrometallurgical processes is disclosed in Pike, Pat. No.

1,570,777 (1926). In this patent Pike discloses a method for leaching bornite ($Cu_5FeS_4$) with ferric chloride at a temperature above the melting point of sulfur and away from air. Pike indicates substantial dissolution of the bornite with minimal formation of undesired sulfates.

However, as reflected by his later patents, Pike was not able to develop this process on a commercial scale. Pike states in his later Pat. No. 1,769,604 (1930) that: "All results of work to date, including my own, show that with all sulfide minerals ferric chloride is a more active solvent than ferric sulfate, but that the former is not, in most cases, active enough to be considered of itself, alone, a satisfactory commercial solvent for many important sulphide minerals, such, for example, as chalcopyrite." Using ferric chloride as the lixiviant or leaching agent, Pike was able to recover only about 90% of the copper in both the chalcopyrite ore concentrate treated in Pat. No. 1,769,604 and the two-thirds bornite ore and one-third chalcopyrite ore concentrate treated in Pat. No. 1,761,641. The other 10% of the copper had to be recovered by a process involving roasting of the ore at high temperatures.

Two 1934 Bureau of Mines papers further illustrate the difficulty in developing a commercial process for leaching copper sulfide minerals and, in particular, chalcopyrite, the principal copper mineral in the United States: Brown and Sullivan, "Dissolution of Various Copper Minerals," Bureau of Mines R.I. 3228 (1934), and Sloan and David, "Hydrometallurgy of Copper Sulphide Ores and Its Relation to Mineral Structure," Bureau of Mines R.I. 3228 (1934). These papers state that there is no practical hydrometallurgical method for completely extracting copper from all sulfide ores. It is suggested that pre-treatment by chlorination or roasting may be required.

More recently, in an article in Metallurgical Reviews, 1960, vol. 5, No. 18, p. 137, entitled "Extraction of Metals From Sulphide Ores by Wet Methods," Forward and Warren state, at p. 159, that "it is most unlikely that, either alone or with added chlorine or oxygen, they (chloride leach solutions) will ever be used extensively for sulphide oxidation in aqueous solutions."

At the present time in the copper industry, hydrometallurgy is generally restricted to the treatment of the more easily leached copper oxide ores and native copper deposits. Aside from waste-dump leaching in copper sulfide mining operations, hydrometallurgy has not been generally applied to sulfide minerals on a commercial scale. In these limited applications of hydrometallurgy, the most commonly used lixiviants are sulfuric acid and ferric sulfate.

SUMMARY OF THE INVENTION

The object of the present invention is to provide a hydrometallurgical process for the treatment of copper-containing materials whereby environmental pollution, especially air pollution resulting from emissions of sulfur oxides, is eliminated, and which at the same time is competitive with conventional pyrometallurgical processes. More particular objects of the hydrometallurgical process according to the present invention are essentially complete dissolution of the contained copper, production of electrolytic grade metallic copper, regeneration of the reagents and removal of impurities from the process solution. Other objects and advantages of the present invention will appear from the following description, examples and claims.

It has been discovered that these objects can be accomplished and that the difficulties of prior art processes can be obviated by the use of a process having four basic stages, which can be briefly described as oxidation, reduction, metal recovery and regeneration-purge.

In the oxidation stage, copper-containing materials are oxidized with a solution containing ferric chloride and cupric chloride to form a solution containing ferrous chloride and additional amounts of cupric chloride. The use of ferric chloride provides for virtually complete dissolution of the copper. The time required for accomplishing essentially complete dissolution of the resistant copper sulfide minerals is temperature dependent for a given particle size. Most of the sulfur in the copper sulfide minerals is not completely oxidized and can be recovered in elemental form. Pyrite is virtually unattacked.

In the reduction stage, cupric chloride in the solution from the oxidation stage is reduced to cuprous chloride. To keep the cuprous chloride from precipitating, a suitable saline metal chloride, such as sodium chloride, potassium chloride and/or magnesium chloride, is included in the process solution. Preferably this reduction is accomplished in two steps; first, reacting the cupric chloride solution with fresh copper sulfide ores at a controlled temperature, preferably about 107° C., and then with additional reducing agent, such as materials containing metallic copper, metallic iron, sulfur dioxide, and/or sodium sulfite.

Any silver if present in the ore will be solubilized as silver chloride in the oxidation and/or reduction stages, from which metallic silver can subsequently be recovered.

In the metal recovery stage, the cuprous chloride from the reduction stage is preferably electrolyzed to deposit metallic copper at the cathode and to regenerate cupric chloride at the anodes. The electrolysis is so arranged as to deposit at the cathode an amount of copper equal to that dissolved into the process solution, and which is at the same time no more than about one-half of the cuprous copper in the electrolyte feed solution. This provides for oxidation at the anodes of the cuprous copper remaining in solution to cupric chloride and avoids the undesired oxidation of ferrous chloride to ferric chloride in the electrolytic cells.

In the regeneration-purge stage, the ferrous chloride in the spent electrolyte is oxidized with air or oxygen to ferric chloride. The cupric ions present in the solution act as a catalyst in accelerating the reaction. Any iron dissolved from the ore being leached or other excess iron dissolved into the system is automatically precipitated as a basic iron oxide. Excess sulfate ions formed from any oxidation of sulfur are also precipitated with the iron. Other contaminants are also precipitated with the iron hydrate whereby their concentration in the process solution is maintained at an acceptable level. The solution containing the regenerated ferric chloride and cupric chloride is recycled to the oxidation stage with or without prior removal of the precipitate.

We have also discovered that the regeneration-purge stage and the oxidation stage may advantageously be combined.

Throughout the process provisions are made to minimize the loss of vapor.

BRIEF DESCRIPTION OF THE DRAWINGS

In the accompanying drawings,

FIGS. 6 through 13 present in graphical form pilot plant operating data obtained while the pilot plant was operating with the oxidation stage at atmospheric pressure and near boiling temperature.

FIG. 14 through 20 present in graphical form pilot plant operating data obtained while the pilot plant was operating with the oxidation stage at 40 p.s.i.g. and 140° C.

DESCRIPTION OF THE PREFERRED EMBODIMENTS

Figure 1:
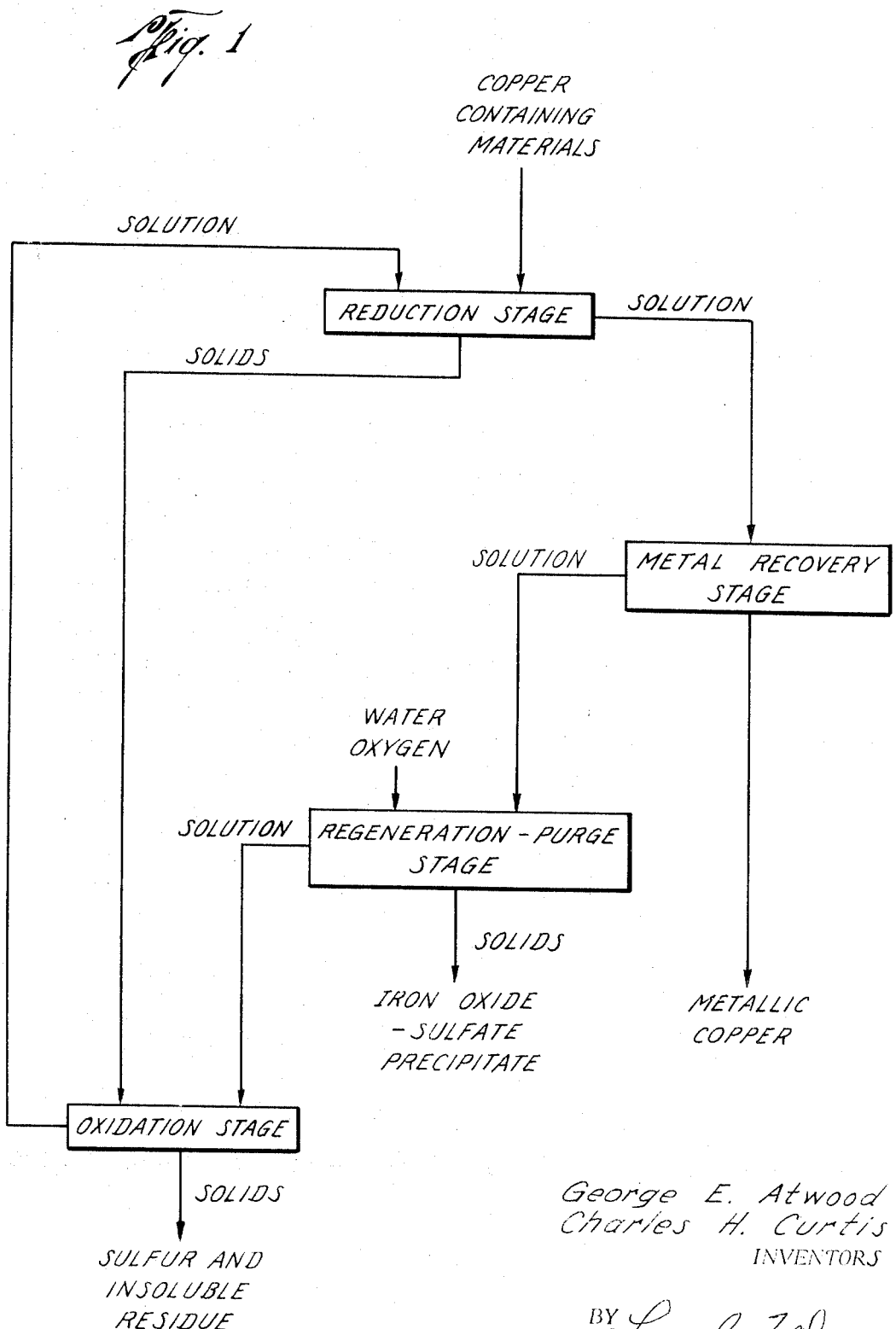
FIG. 1 presents a simplified flow diagram of the process of this invention for the treatment of copper containing materials.
Figure 2:
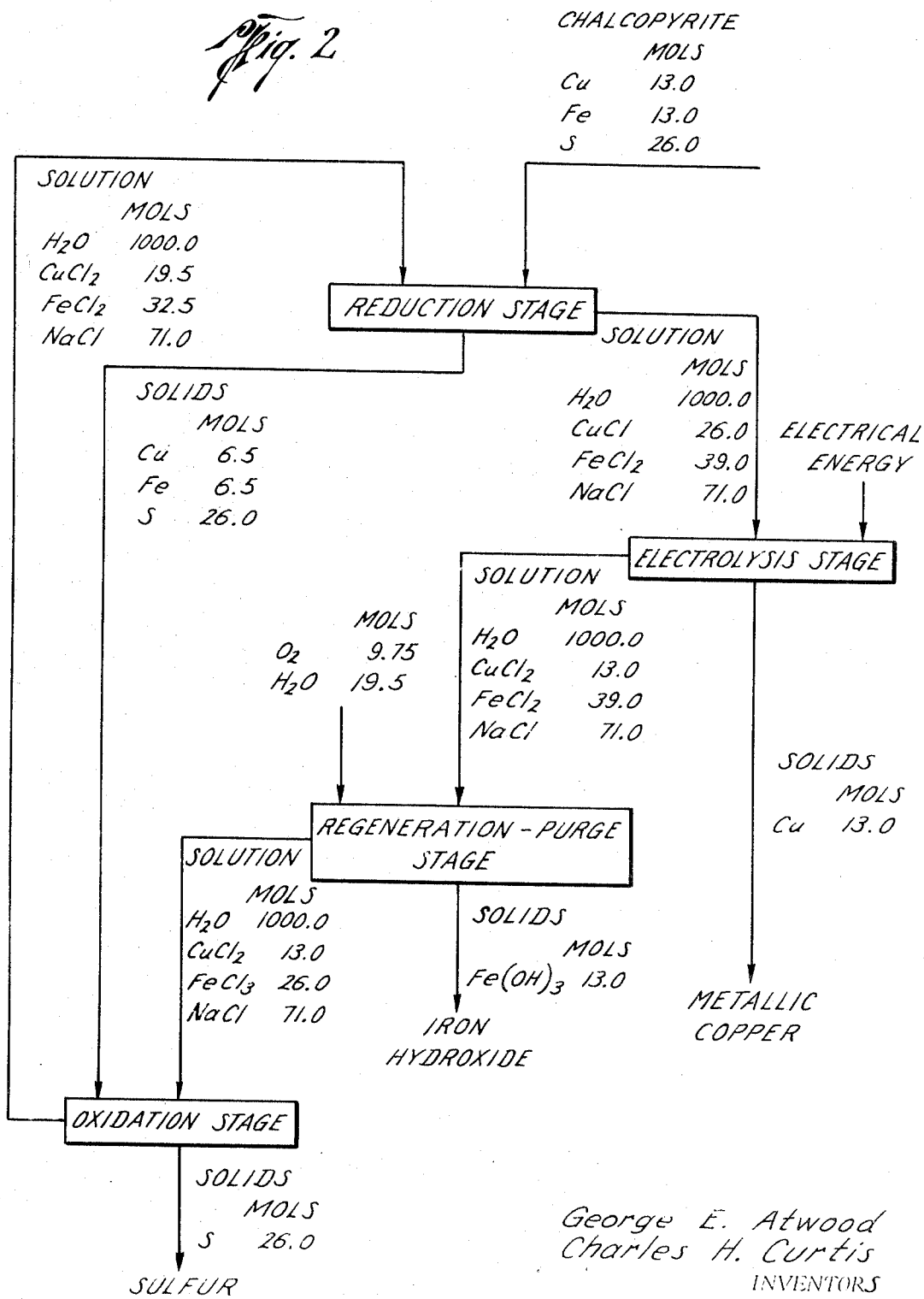
FIG. 2 diagrammatically presents a stoichiometric molar balance to illustrate the basic chemistry of the process of this invention applied to chalcopyrite.

Simplified basic process for the treatment of copper-containing material will readily be understood from the diagram of FIG. 1, and the basic chemistry is illustrated by the stoichiometric molar balance of FIG. 2, as applied to chalcopyrite. For a more complete description of the preferred embodiments, however, reference should be made to FIG. 3 and the following description.

Figure 3:
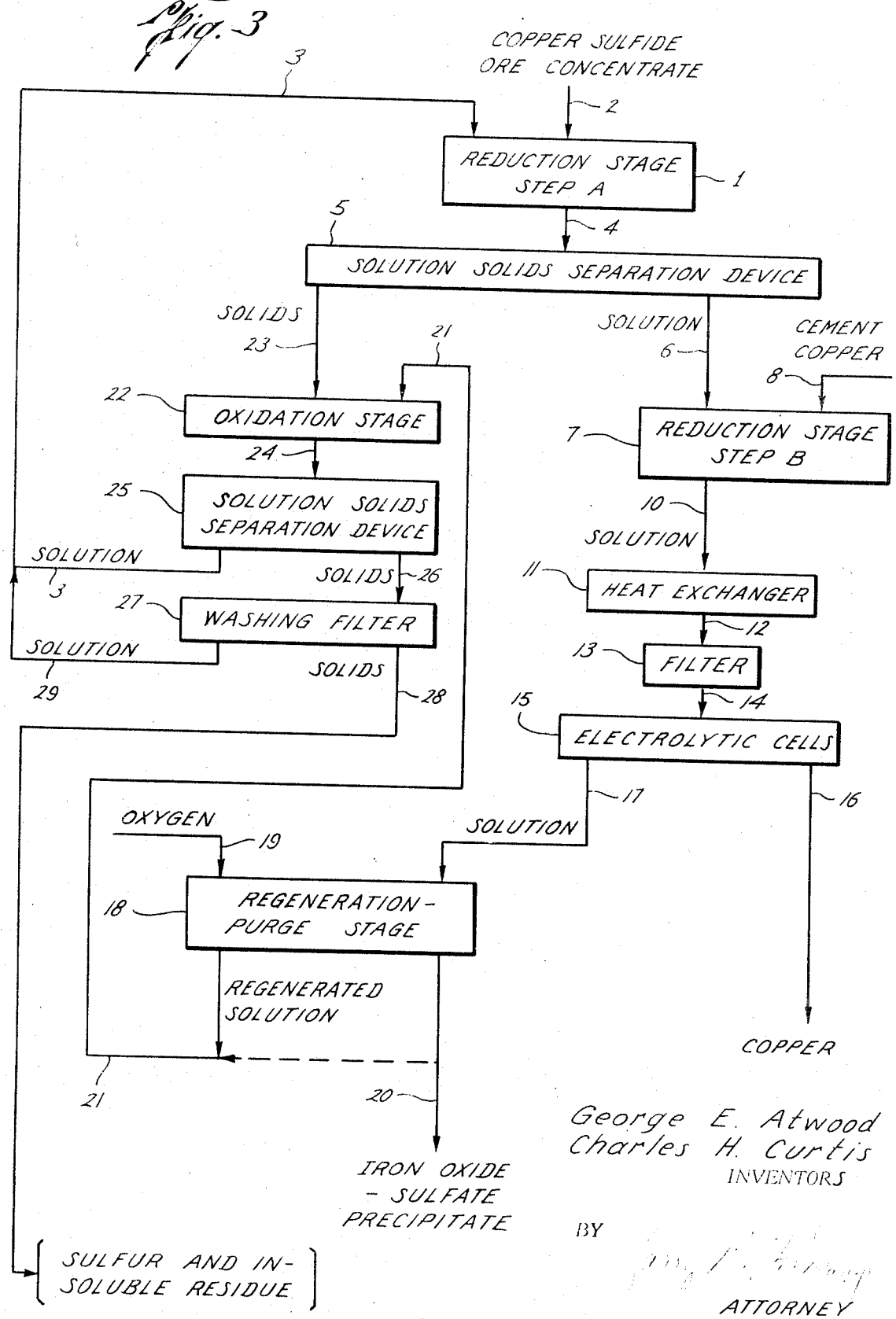
FIG. 3 presents a flow diagram of one embodiment of the process according to this invention.

In the treatment of copper sulfide ore concentrates comprised principally of chalcopyrite, the fresh ore concentrates are added to reduction stage 1, step A, through line 2 (FIG. 3). As used herein, "fresh" or "raw" refers to copper-containing materials not previously reacted with any reagent in the process. Cupric chloride and sodium chloride, along with ferrous chloride, are introduced into the reduction stage 1, step A, through line 3. In the reduction step 1, step A, which is essentially closed to the atmosphere, the cupric chloride in the solution is substantially reduced to cuprous chloride by reaction with the sulfide ore concentrates at near atmospheric boiling temperature, about 107° C. The partially reacted sulfide ore concentrates as well as the solution containing some unreduced cupric chloride, the cuprous chloride, ferrous chloride and sodium chloride are passed through line 4 to separation device 5, where the solids are separated from the solution by gravity sedimentation.

The solution from separator 5 containing cupric chloride, cuprous chloride, ferrous chloride and sodium chloride is then passed through line 6 to reduction stage 7, step B, into which is also passed cement copper through line 8. The cement copper is used to reduce substantially all the remaining cupric chloride to cuprous chloride at near atmospheric boiling temperature, about 107° C. Concurrently, the cement copper is solubilized in the form of cuprous chloride.

The solution from reduction stage 7, step B, containing cuprous chloride, ferrous chloride and sodium chloride is removed therefrom through line 10 into heat exchanger 11 where the temperature of the solution is preferably adjusted to about 55° C. The solution leaves heat exchanger 11 through line 12 and then enters a suitable filter 13, such as a sand filter, for the removal of any suspended solids.

If a calcium sulfate salt accumulates in the process solution it can be controlled to an acceptable level by providing a crystallization step for its removal from the system.

The filtered electrolyte solution then passes through line 14 and enters into electrolytic cells 15. In these cells, which are partitioned with diaphragms, cuprous chloride is electrolyzed to deposit metallic copper at the cathodes and to regenerate cupric chloride at the anodes. Metallic copper together with any silver deposited therewith is removed from the electrolytic cells 15 at 16.

The solution from the electrolytic cells containing ferrous chloride, sodium chloride and regenerated cupric chloride is then passed through line 17 to regeneration-purge stage 18. With the reaction temperature maintained at about 107° C. and the pressure at about 40 p.s.i.g., air or oxygen is passed through line 19 into stage 18 wherein the ferrous chloride is oxidized to ferric chloride, with the cupric chloride in the solution acting as a catalyst. Any excess iron in the system, i.e., iron that has been dissolved into the process solution, is precipitated. Any excess sulfates and other contaminants present in the system are precipitated concurrently. These precipitates, optionally, can be removed from stage 18 through line 20 or advanced with the solution through line 21.

The solution containing the regenerated ferric chloride, cupric chloride and sodium chloride is then passed from stage 18 through line 21 to oxidizing stage 22. Also added to stage 22 through line 23 are the solids, including the partially reacted ore concentrates from separation device 5. In stage 22 which is substantially closed to the atmosphere, ferric chloride and cupric chloride react with the solids at a temperature near 140° C., and a pressure of about 40 p.s.i.g., so as to essentially completely dissolve the copper therefrom.

After cooling to a temperature below atmospheric boiling to prevent flashing, at which temperature the elemental sulfur exists in a solid form, the resultant slurry containing the sulfur, insoluble residue, ferrous chloride, cupric chloride and sodium chloride, and optionally, the iron oxide-sulfate precipitate from the regeneration stage is passed through line 24 into separation device 25. In this device, gravity sedimentation is used to separate the insoluble residue and sulfur from the solution containing cupric chloride, ferrous chloride and sodium chloride. This solution is then recycled through line 3 to reducing stage 1, step A. The solids are removed from device 25 through line 26 to a washing filter 27 where substantially all remaining process liquor is displaced. The filtered solids (sulfur and insoluble residue) are removed at 28 and the recovered liquid is added to the solution in line 3 through line 29. The solids can be further treated by conventional methods to remove elemental sulfur and any insoluble precious metals.

Although one embodiment of this invention has been described in relation to the treatment of copper sulfide ore concentrates comprised principally of chalcopyrite, it has also been found that a mixture of such sulfide ore concentrates and non-sulfide minerals, such as native copper and copper oxides, carbonates and silicates, can likewise be effectively treated in accordance with the present invention. Accordingly, since substantially all copper ores contain chalcopyrite, the process of our invention has the important advantage that practically any copper ore concentrate or any mixture of copper ore concentrates can be leached on a commercial basis.

As stated previously, for a hydrometallurgical process to be competitive with conventional pyrometallurgical processes there must be essentially complete dissolution of the copper ore. In other words, in excess of about 99% of the copper in the copper ore should be solubilized. Under some circumstances, however, the process of this invention would be competitive even without essentially complete solubilization, provided that substantial solubilization is achieved. It is also important for the efficient recovery of the copper as metallic copper that the copper in solution be in the form of cuprous chloride. With respect to these objectives, ferric chloride has been found to be a suitable oxidizing agent at moderate temperatures and pressures. However, in order to positively assure essentially complete dissolution of copper-iron sulfide minerals, the ferric chloride reaction should be controlled in such a manner that cupric chloride rather than cuprous chloride is formed. For example, in the treatment of chalcopyrite, the reaction with ferric chloride to form cupric chloride is as follows:

(1) 

We have discovered that this reaction is completed near the oxidation potential of cupric chloride. If the above reaction is modified in order to produce cuprous chloride, as by using 3 moles of ferric chloride instead of 4, the desired dissolution of copper in excess of about 99% from resistant sulfide minerals such as chalcopyrite is less assured.

Accordingly, in order to meet the objectives of essentially complete dissolution of copper and the formation of cuprous chloride, we have found it necessary to use two basic stages, oxidation and reduction. In the treatment of chalcopyrite in accordance with the present invention, it is preferred to conduct the oxidation stage on partially reacted chalcopyrite from the first step of the reduction stage, using ferric chloride in accordance with Equation 1 to substantially complete the solubilization of the chalcopyrite. The copper contained in the resulting reaction solution will be substantially cupric chloride, which is then reacted with fresh chalcopyrite concentrates in the first of the reduction stage to substantially reduce the cupric chloride to cuprous chloride according to the following reaction:

(2) $CuFeS_2 + 3CuCl_2 \rightarrow 4CuCl + FeCl_2 + 2S$

As has been previously mentioned herein, a suitable saline metal chloride such as sodium chloride, potassium chloride, magnesium chloride or any mixture thereof, is maintained in the reaction solution to prevent the precipitation of the cuprous chloride.

The oxidation stage is advantageously conducted at an elevated temperature to lower the reaction time required for substantially complete dissolution of the copper. It is believed that at a temperature above the melting point of sulfur but below the temperature at which the viscosity of sulfur rises abruptly, i.e., within the range from about 115° C. to about 159° C., the superheated aqueous solution displaces the molten sulfur from the mineral surfaces, thus preventing "blinding" and exposing the minerals to contact by the oxidizing solution. The preferred temperature range is near the minimum viscosity of sulfur, i.e., about 140° C. to about 150° C. For example, the desired dissolution of copper in excess of 99% from a chalcopyrite concentrate having a typical particle size of about 90% passing 200 mesh has been achieved in thirty minutes at 140° C.

We have found that conducting the oxidation stage at atmospheric boiling temperature requires extension of the mean reaction time to ten or twelve hours to obtain the desired 99% dissolution of copper from typically sized chalcopyrite concentrates. Thus, from an operating standpoint, the mechanical advantage of atmospheric pressure can be obtained at the expense of extending the reaction time.

The first step of the reduction stage of this invention, as mentioned earlier in the specification (also referred to as step A), provides for substantial reduction of the cupric chloride from the oxidation stage to cuprous chloride by the use of fresh copper sulfide ore. In the recovery of metallic copper by electrolysis, in accordance with the present invention, it is advantageous to present the copper in solution as cuprous chloride so as to reduce by a factor of two the electricity per unit of copper electrolytically precipitated as compared with either conventional copper (cupric) sulfate electrolysis or electrolysis of cupric chloride. It is therefore one advantage of this invention that substantial reduction of cupric chloride to cuprous chloride can be effected in the first step of the reduction stage by the use of copper sulfide ore concentrates. As this simultaneously results in the solubilization of some copper in the ore, the amount of ferric chloride needed in the oxidation stage is correspondingly reduced. As indicated in FIG. 2, approximately 50% of fresh ore is typically reacted in the first step of the reduction stage.

Any copper sulfide mineral, such as covellite (CuS), which does not effect the reduction of cupric chloride will be solubilized in the oxidation stage.

In reacting cupric chloride from the oxidation stage with chalcopyrite in accordance with Equation 2 above, we have discovered that the degree of reduction achievable (at least 70%) is limited by a secondary reaction resulting in the loss of copper from solution. We believe on the basis of evidence currently available that a stable form of copper sulfide is precipitated. It has further been discovered that the reaction is temperature sensitive, and that by limiting the temperature to atmospheric boiling, about 107° C., the reduction of cupric chloride that is possible with minimal or no loss of copper from solution can be obtained in about four hours' mean reaction time. Thus it will be understood that limiting the temperature of the reduction reaction can limit the reaction rate to an extent that permits practical control of the reaction.

In the use of sodium chloride to keep the cuprous chloride in solution it has also been discovered that the sodium chloride tends to enhance the reduction of cupric to cuprous chloride and to retard the oxidation of sulfur. The concentration of sodium chloride in accordance with this invention is maintained preferably at a level as high as permitted by its solubility in the process solution.

Further reduction of the cupric chloride to cuprous chloride can be achieved with appropriate reducing agents such as sulfur dioxide, sodium sulfite, metallic iron, and materials containing metallic copper. To the extent that scrap copper or cement copper is available economically, its use, obviously, would be advantageous in that this copper is upgraded to electrolytic grade copper in the electrolysis stage. In fact, the entire reduction of cupric chloride to cuprous chloride can be accomplished by any of these reducing agents. The extent of use of reducing agents which would contribute sulfate to the solution involves careful consideration of the rejection of this sulfate in the regeneration-purge stage discussed later in this specification.

In this second step of the reduction stage (also referred to as step B), the temperature at which the reaction is advantageously conducted will vary according to the specific reducing agent used. For example, in using cement copper or metallic iron, a reaction temperature near atmospheric boiling (about 107° C.) has been found satisfactory.

In both the oxidation and reduction stages, it has been found preferable to conduct the reactions out of contact with the atmosphere to minimize vapor loss, and in the reduction stage to avoid oxidation of cuprous chloride to cupric chloride.

We have found it advantageous to control the temperature of the pregnant or cuprous chloride solution feed to the electrolytic cells. Increasing temperature increases the electrical conductivity of the electrolyte, and enhances the solubility of dissolved salts, both of which effects are advantageous; however, the vapor pressure of hydrochloric acid in the electrolyte also increases, which is disadvantageous. Laboratory experimentation and also experimental pilot plant operation have indicated that a temperature range of about 30° C. to about 60° C. is acceptable for electrolysis; however, a temperature of about 55° C. is preferred as described in the embodiment of FIG. 3.

It has also been found preferable to clarify the pregnant solution before it is passed into the electrolytic cells. This is done to remove any small particles still remaining in the solution which could adversely affect the quality of the metallic copper deposited at the cathodes in the electrolytic cells. This can be accomplished by any suitable filtering apparatus, such as a sand filter.

If calcium salts accumulate in the solution, their removal may be effected by crystallization in conjunction with the aforementioned temperature adjustment of the pregnant solution prior to electrolysis.

Figure 4:
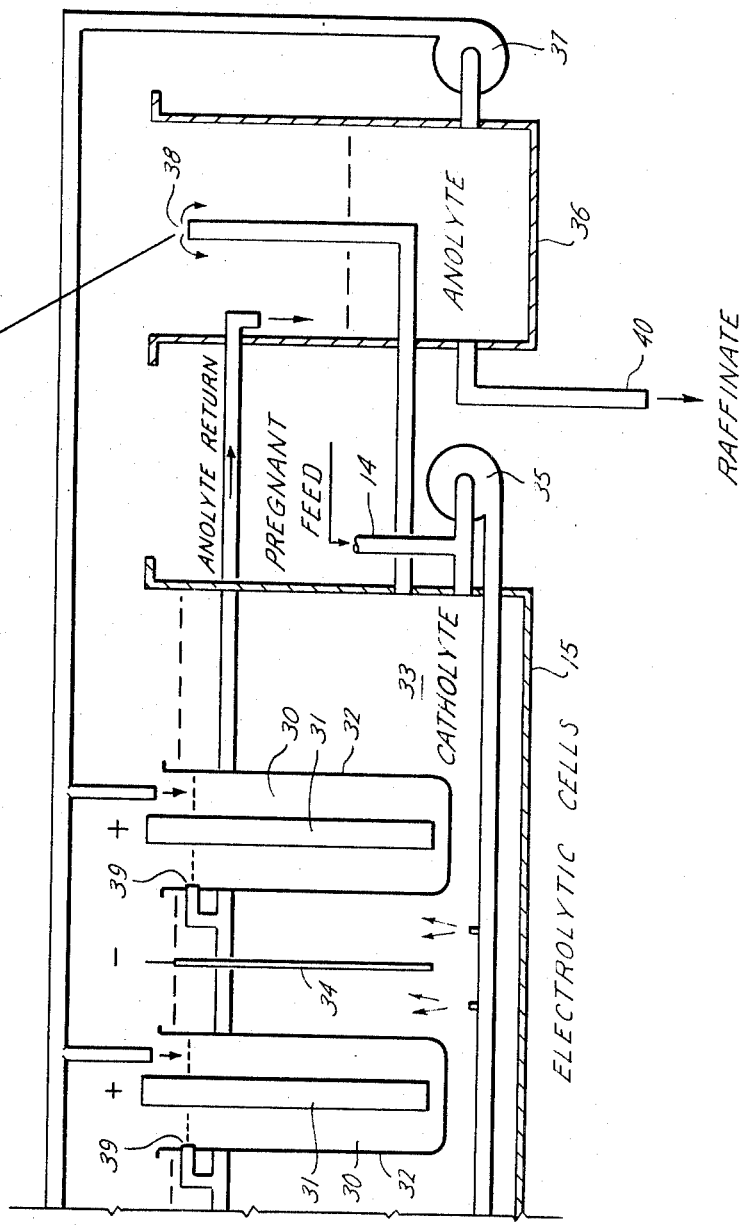
FIG. 4 is a diagrammatic representation of a portion of the diaphragm-equipped electrolytic cells shown in FIG. 3.

In accordance with this invention, the electrolysis of the pregnant (feed) solution, which contains cuprous chloride and ferrous chloride, is conducted in electrolytic cells 15, illustrated in FIG. 4, in which the anolyte solution in contact with inert anodes 31, such as carbon, in anolyte compartments 30 is separated by diaphragms 32 from the catholyte solution in contact with copper cathode 34 in catholyte compartment 33.

The desirable characteristics of diaphragms are that they be substantially inert to the solution and have maximal resistance to hydraulic flow of the solution and minimal electrical resistance. Available materials to meet these requirements include Teflon, polypropylene, polyethylene, and polyacrylic, all of suitable texture, including felted, woven, needled, or gas-expanded, processed as required to establish desirable limited permeability to solution flow, together with minimal electrical resistance Other available materials include membranes used in electrical de-salination of water, such as chlorosulfonated polyethylene sheets.

To provide agitation and displacement of the solution in contact with the surface of cathode 34 in order to promote satisfactory copper plating, positive circulation of the catholyte solution is provided by circulation pump 35. A suitable filtering device, not shown, may be used to maintain clarity of the catholyte solution. Similarly, the anolyte solution is separately circulated through the anode compartments 30 and anolyte sump 36 by means of pump 37. The degree of circulation required for the catholyte solution which directly influences the plating on the cathode 34, is much greater than that required for the anolyte solution, which requires mixing sufficient only to maintain homogeneity of the solution. The relative levels of solution in catholyte compartment 33 and anolyte compartment 30 of the electrolytic cell are controlled by weir-type arrangements to maintain a hydraulic gradient from catholyte compartment 33 to anolyte compartment 30 in order to preclude the counterflow of anolyte solution into catholyte compartment 33. As explained below, the anolyte solution contains cupric chloride. If this solution were permitted to flow into the catholyte compartment 33, it would tend to re-dissolve copper from cathode 34. The new feed of pregnant solution is added through line 14 and circulation pump 35 to catholyte compartment 33 with the level therein controlled by overflow from catholyte level control weir 38 into anolyte sump 36. The solution in anolyte compartment 30 in turn overflows anolyte level control weir 39 to anolyte sump 36. Raffinate 40 (the impoverished or spent electrolyte), is displaced from anolyte sump 36 at a rate commensurate with the pregnant solution inflow to catholyte compartment 33.

Electrolysis conducted in the system, as revealed above, results in the transfer of copper ions to the cathode to be precipitated thereon as metallic copper and the simultaneous transfer of chloride ions to the anode to be released in the presence of the anolyte solution, thereby oxidizing the cuprous chloride therein to cupric chloride. In accordance with this invention, the process is preferably controlled so that the copper electrolytically precipitated amounts to no more than about one-half the cuprous copper content of the pregnant solution feed to electrolysis. This is preferred in order that the chloride ions released from the copper precipitated will stoichiometrically oxidize the matching cuprous chloride in the anolyte to cupric, and avoid the oxidation of ferrous chloride to ferric, which would increase the voltage requirements and decrease the efficiency of the electrolysis. However, it should be noted in this regard that the presence of ferrous chloride offers protection against loss of chlorine from the system should more than the desired one-half of the cuprous chloride content of the electrolysis feed solution be electrolytically precipitated.

Any silver present that has been solubilized as silver chloride in the oxidation and/or reduction stages can be recovered in a relatively concentrated form in preliminary electrolysis conducted prior to the regular copper production electrolysis.

The regeneration-purge stage of this invention provides for the treatment of the raffinate from the electrolysis to regenerate the cupric chloride-ferric chloride reaction solution for the oxidation stage, and at the same time to precipitate excess iron as well as sulfate ions and other contaminants from the solution. It is revealed that oxidation of cuprous chloride, if present, to cupric chloride, and ferrous chloride to ferric chloride may be accomplished with either air or oxygen. The presence of cupric chloride catalyzes the oxidation of ferrous to ferric chloride.

It has been discovered that the precipitation of excess iron i.e., the equivalent of any iron dissolved into the process solution, can be made self-regulating by maintaining constant the overall inventory of chloride ions in the reaction solution. When the oxidation reaction re-establishes the original balance of cupric and ferric chloride in the solution, the excess iron is deprived of chloride ions and precipitates by hydrolysis as basic iron oxide.

We have also discovered that sulfate ions are concurrently precipitated with the iron whereby the sulfate ion concentration in the process solution is limited to an acceptable level, thus also contributing to the maintenance of the ion inventory. It has been found that the ratio of sulfate ions to iron in the combined precipitate is essentially that of the compound: jarosite. Control of the precipitation capacity for jarosite, which has favorable filtering characteristics, can be exercised through the dissolution of iron or sulfur into the process solution to maintain their balance in approximate accordance with this ratio. In addition, it has been found that the iron precipitate has an advantageous scavenging effect in that other metal impurities are concurrently precipitated. In the event insufficient iron is dissolved into the process solution from the ore or from metallic iron used in the reduction stage for the precipitation of undesirable amounts of sulfate and other impurities, iron may be added to the process solution.

It is further noted that the reaction temperature and the vapor pressures for the regeneration-purge stage influence the results obtained. Increasing temperature tends to increase the reaction rate, but decreases the solubility of oxygen, which, however, is also directly influenced by its partial pressures. Temperature also influences the physical characteristics of the precipitate which determines its filterability for its ultimate removal from the process system. Acceptable laboratory results have been obtained at atmospheric pressure and near the boiling temperature (about 107° C.), with the corresponding reaction time of six hours using oxygen, or twelve hours using air. Laboratory tests conducted at as high as 60 p.s.i.g. and 130° C., using oxygen for about 30 minutes reaction time have yielded satisfactory results. Laboratory results have been confirmed by pilot plant operations to yield acceptable results at 40 p.s.i.g. and 107° C., with less than one hour reaction time using oxygen.

According to this invention, the oxidation stage, in which the partially reacted solids from the reduction stage are treated for the maximum dissolution of the copper content, uses the regenerated cupric chloride-ferric chloride solution from the regeneration-purge stage. If separate recovery of the iron precipitate formed in the regeneration-purge stage is desired, only the regenerated solution need be advanced to the oxidation stage. In this respect it is evident that the potential economic value of the jarositic iron oxide-sulfate precipitate for use as a soil conditioner-fertilizer could justify a process step for its separate recovery. However, it has also been discovered that the separation of the precipitate may be omitted and the combined regenerated solution, including the precipitate, may be added to the oxidation stage without impairing the dissolution of the copper, in which event the final insoluble residue from the oxidation stage will also include the precipitate formed in the regeneration-purge stage. Moreover, by introducing iron precipitate into the reduction stage, its scavenging properties can be made available to the process solution prior to electrolysis.

The residue from the oxidation step consists primarily of elemental sulfur, pyrite and other insoluble constituents in the ore concentrate, including any gold if present in the ore concentrate. The gold can be recovered from the residue by conventional cyanidation methods.

The residue from the oxidation stage can be separated from the resultant slurry by various methods. One method provides for the controlled cooling of the slurry, if required, to below the temperature at which the sulfur released from the ore solidifies, so as to cause the crystallization of the sulfur into a form that will improve subsequent separation from the solution. The solids, including the sulfur, can be separated from the solution by vacuum filtration. If desired the sulfur can then be separated from the insoluble residue by heating the solids to a temperature at which the sulfur liquefies, followed by filtering.

Another procedure provides for the high temperature separation of the aqueous solution from the molten sulfur and the insoluble solids residue. The temperature for gravity separation of the phases should be established above the melting point of sulfur (i.e., about 115° C.) and safely below the temperature at which a rapid rise in the viscosity of the liquid sulfur occurs (i.e., about 159° C.) to facilitate the decantation of the aqueous solution from the molten sulfur and the insoluble residues in a separation device. The molten sulfur, together with the insoluble solids residue, is withdrawn from the device, and while still molten the sulfur can be separated from the included solids as quality grade elemental sulfur.

The important contribution of sodium chloride to increase the solubility of cuprous chloride in the process solution has been described in the literature. However, in accordance with this invention, a more broadly favorable role for sodium chloride in the process has been discovered: (1) the desirable effect of sodium chloride in retarding the secondary reaction which results in the loss of copper from solution in the reduction stage; (2) the advantageous effect of sodium chloride in enhancing the solubilization of copper in the oxidation stage; (3) the retarding effect of sodium chloride on the oxidation of sulfur to sulfate ions; (4) the protective effect of sodium chloride against the atmospheric re-oxidation of cuprous chloride during handling the solution from the reduction stage through the metal recovery stage; and (5) the favorable effect of sodium chloride on the properties of the electrolytically precipitated copper. In view of the broadly favorable role of sodium chloride in the process, as revealed above, the importance of its presence in the process solution at near the maximum concentration permitted by its solubility will be readily appreciated.

Additionally, we have discovered that, if desired, the regeneration-purge stage and the oxidation stage can be combined. The raffinate from electrolysis can be added directly to the partially reacted solids from the reduction stage, oxygen introduced, and the simultaneous oxidation and regeneration conducted in accordance with the preferred temperature and vapor pressure conditions to yield the desired copper dissolutions and basic iron oxide-sulfate precipitation. We have also discovered that when the oxidation stage is conducted with the regeneration-purge stage, the concentration of iron in the reaction solution can decline to nearly zero with no impairment of the copper dissolution. The resultant reduction in iron concentration in the electrolyte is beneficial to electrolysis in maintaining the quality of the electrolytic copper. For example, laboratory testing conducted in accordance with the above procedure at 140° C. and 60 p.s.i.g., using oxygen oxygen, with 60 minutes reaction time, yielded 99.5% dissolution of the copper from copper sulfide ore concentrates, consisting principally of chalcopyrite, and having a typical particle size range. The oxidation of sulfur to sulfate ions was an acceptable 4.8%.

Effective methods for monitoring and controlling the process of this invention have been developed. Measurement of the EH (oxidation potential) and pHE (hydrogen ion potential) of the process solution satisfactorily reveals the progress of the chemical reactions through the various steps of the process. Information derived from laboratory bench tests and pilot plant continuous operation have revealed the following readings in Table I as typical for satisfactory process performance:

TABLE I

| Process solution | EH: +mv.[1] | pHE: +mv.[1] |
|---|---|---|
| Oxidation stage discahrge | 460-475 | 380 |
| Reduction stage discharge: | | |
| Step A | 340 | 440 |
| Step B | 300 | 440 |
| Electrolysis stage: | | |
| Catholyte | 300 | 440 |
| Anolyte | 460 | 440 |
| Regeneration-purge stage discharge | 600 | 440 |

[1] Reference electrode: Ag-AgCl$_2$.

Laboratory batch tests on typical copper sulfide flotation concentrates, containing about 25% copper, principally as chalcopyrite, demonstrate copper dissolution in accordance with the oxidation stage of this invention. The tests were conducted at 140° C. and 33 p.s.i.g., and were structured in accordance with the stoichiometric molar balance of FIG. 2, using simulated regenerated leach liquor without the iron precipitate. Pertinent data from these tests appear in Table II:

TABLE II

| Reaction time | Percent of Cu. dissolved | Percent of S= ox. to SO$_4$= | Oxidation potential | | Residue, percent Cu |
|---|---|---|---|---|---|
| | | | Start, mv. | End, mv. | |
| 15 minutes | 97.7 | 1.6 | +635 | +450 | 1.02 |
| 30 minutes | 99.4 | 2.1 | +645 | +412 | 0.31 |
| 60 minutes | 99.9 | 3.2 | +642 | +409 | 0.07 |

It will be noted that copper dissolution in excess of 99% was achieved in 30 minutes reaction time with corresponding oxidation of sulfide sulfur to sulfate ions limited to 2.1%.

Similarly, laboratory tests were run to demonstrate the oxidation stage conducted at atmospheric pressure and near the boiling temperature of about 107° C. Pertinent data are tabulated below in Table III:

TABLE III

| Reaction time | Percent of Cu. dissolved | Percent of S= ox. to SO$_4$= | Oxidation potential | | Residue, percent Cu |
|---|---|---|---|---|---|
| | | | Start, mv. | End, mv. | |
| 4 hours | 97.8 | 2.0 | +673 | +417 | 1.75 |
| 5 hours | 98.2 | 2.4 | +673 | +417 | 1.32 |
| 6 hours | 98.9 | 3.9 | +673 | +410 | 0.77 |
| 7 hours | 99.5 | 4.0 | +673 | +402 | 0.37 |

It will be noted that the copper dissolution progressively increased from 97.8% to 99.5% as the reaction time was extended from four hours to seven hours. The corresponding oxidation of sulfide sulfur to sulfate ions ranged from 2.0% to 4.0%.

With respect to step A of the reduction stage of this invention, data from laboratory batch tests presented in Table IV illustrate the dramatic effect of temperature on the reaction rate. The tests were structured in accordance with the stoichiometric molar balance of FIG. 2 for reaction of 50% of the copper in the raw copper sulfide concentrate, containing about 25% copper, principally as chalcopyrite. A simulated oxidation stage discharge solution containing about 23 grams of sodium chloride per 100 cc. of water in the solution was used.

TABLE IV

| Reaction | | Percent of copper | | Oxidation potential, final, mv. |
|---|---|---|---|---|
| Temp., °C. | Time | Reacted | Solubilized | |
| 143 | 7.5 minutes | 49.0 | 39.5 | +297 |
| 143 | 15.0 minutes | 51.1 | 31.3 | +291 |
| 143 | 30.0 minutes | 50.0 | 21.5 | +295 |
| 107 | 1 hour | 48.4 | 47.3 | +346 |
| 107 | 2 hours | 50.5 | 48.3 | +320 |
| 107 | 3 hours | 47.2 | 46.1 | +320 |
| 107 | 6 hours | 49.4 | 47.2 | +309 |
| 107 | 18 hours | 47.2 | 30.8 | +296 |

It will be noted that the expected reaction of 50% of the copper in the feed solids is substantially achieved throughout the tests. However, at the elevated temperature, even for the shortest reaction time, just 39.5% of the copper was solubilized. This declined to 21.5% for 30 minutes reaction time. In other words, though the desired 50% of the copper in the feed was reacted, only 21.5% was solubilized in the solution, indicating a loss of 28.5% of the copper from solution. The corresponding oxidation potential of the final reaction solution was measured at +295 mv.

In comparison, the results obtained at atmospheric boiling temperature, about 107° C., illustrate the dramatic improvement in the percent copper solubilized. Extending the reaction time from one hour to six hours resulted in only minor losses of copper from solution, as indicated by comparing the copper reacted and the copper solubilized. The corresponding oxidation potential of the final reaction solution ranged from +346 mv. at one hour reaction time to +309 mv. at six hours. The corresponding cuprous content of the final reaction solution was determined to be about 75% of the total copper content of the solution. Extending the reaction time to 18 hours at 107° C. dropped the oxidation potential of the reaction solution to +296 mv. with 30.8% of the copper solubilized, indicating a loss of 16.4% of the copper from solution.

Figure 5:
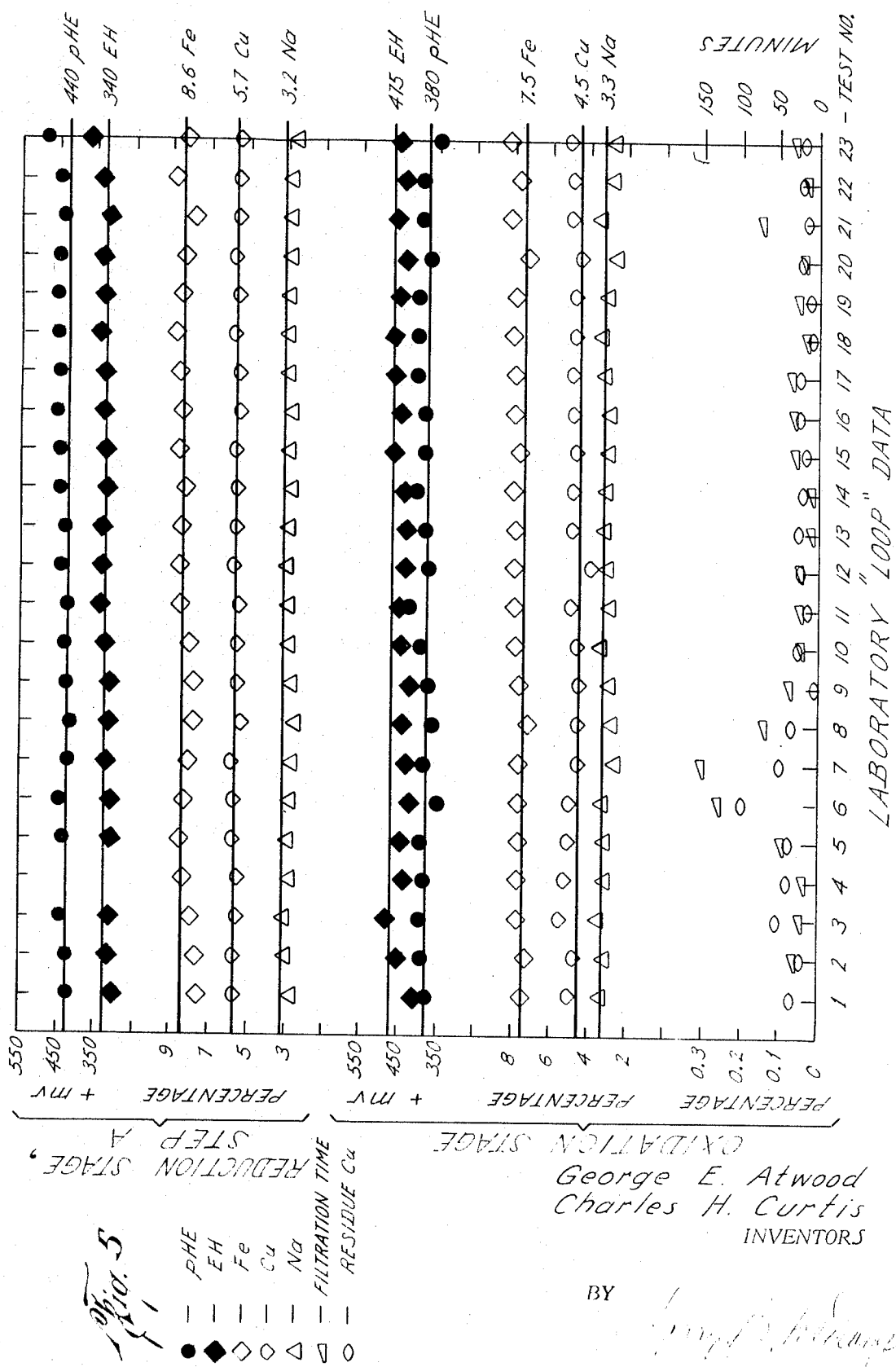
FIG. 5 presents in graphical form data obtained from laboratory "loop" tests.
Figure 6:
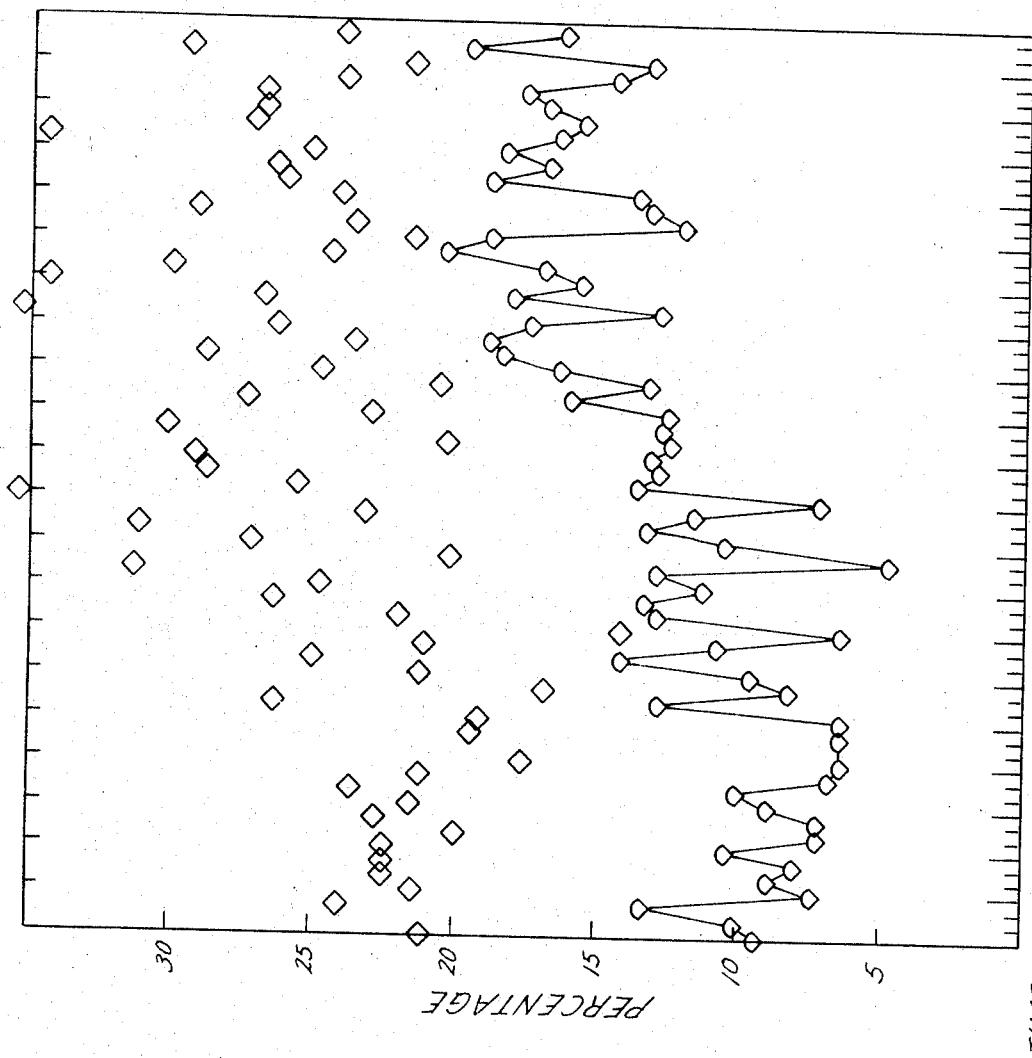
Figure 7:
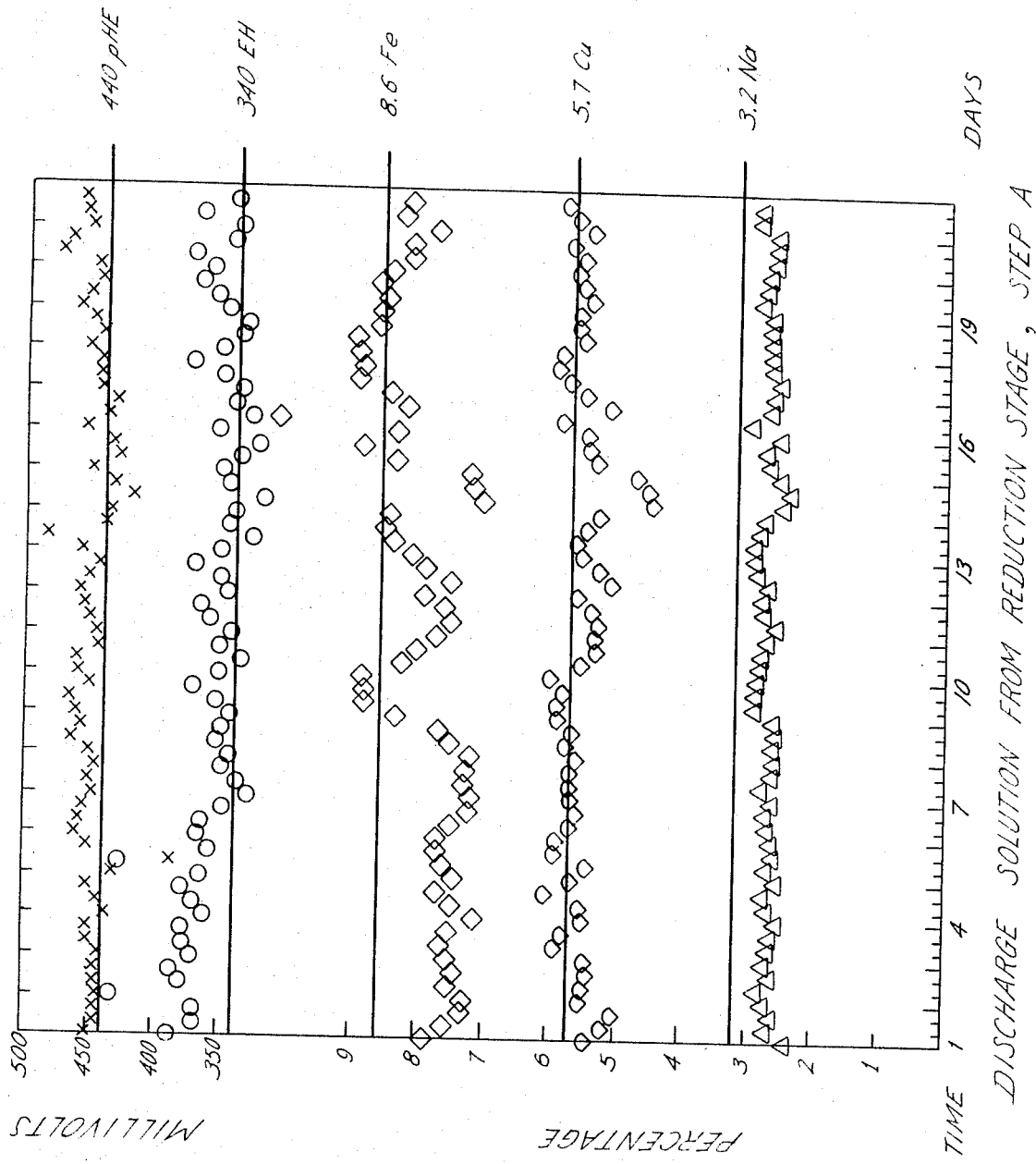
Figure 8:
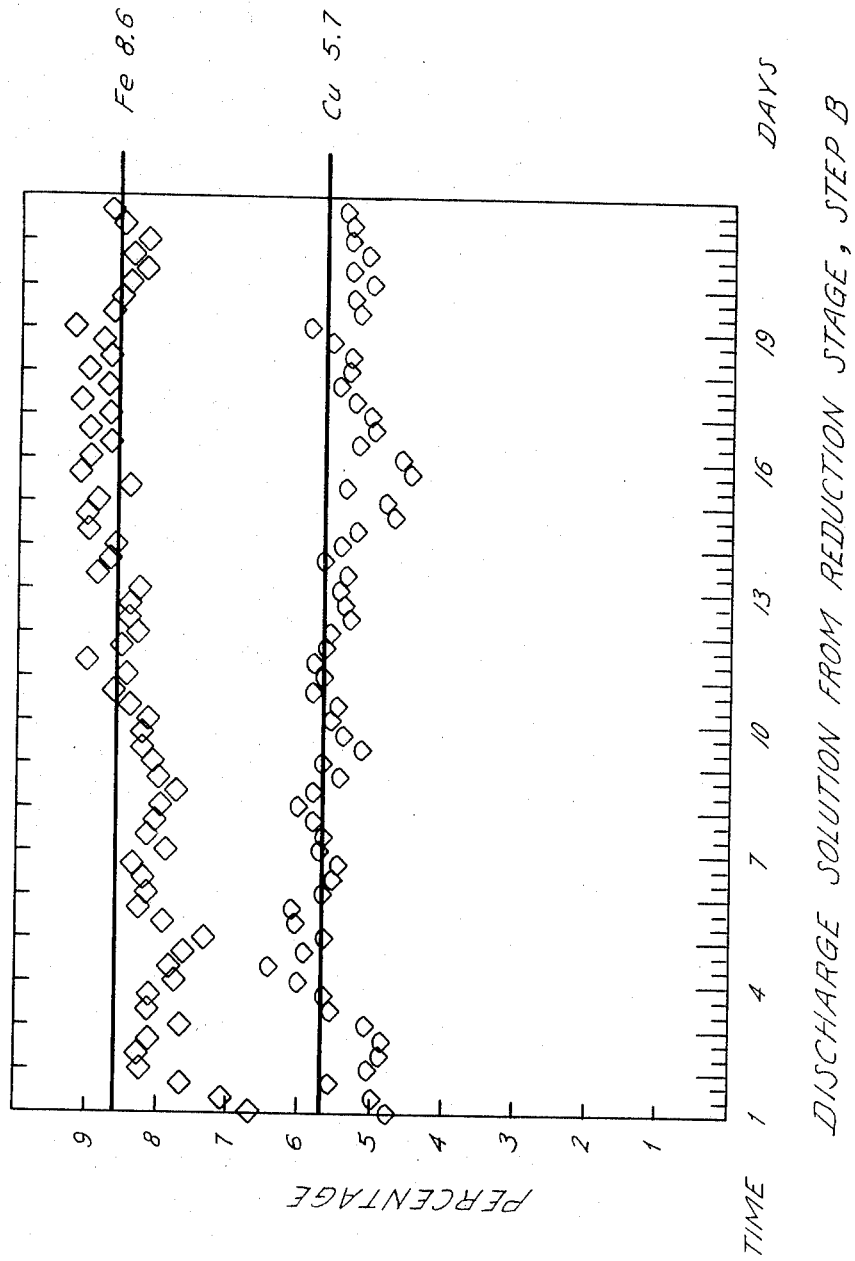
Figure 9:
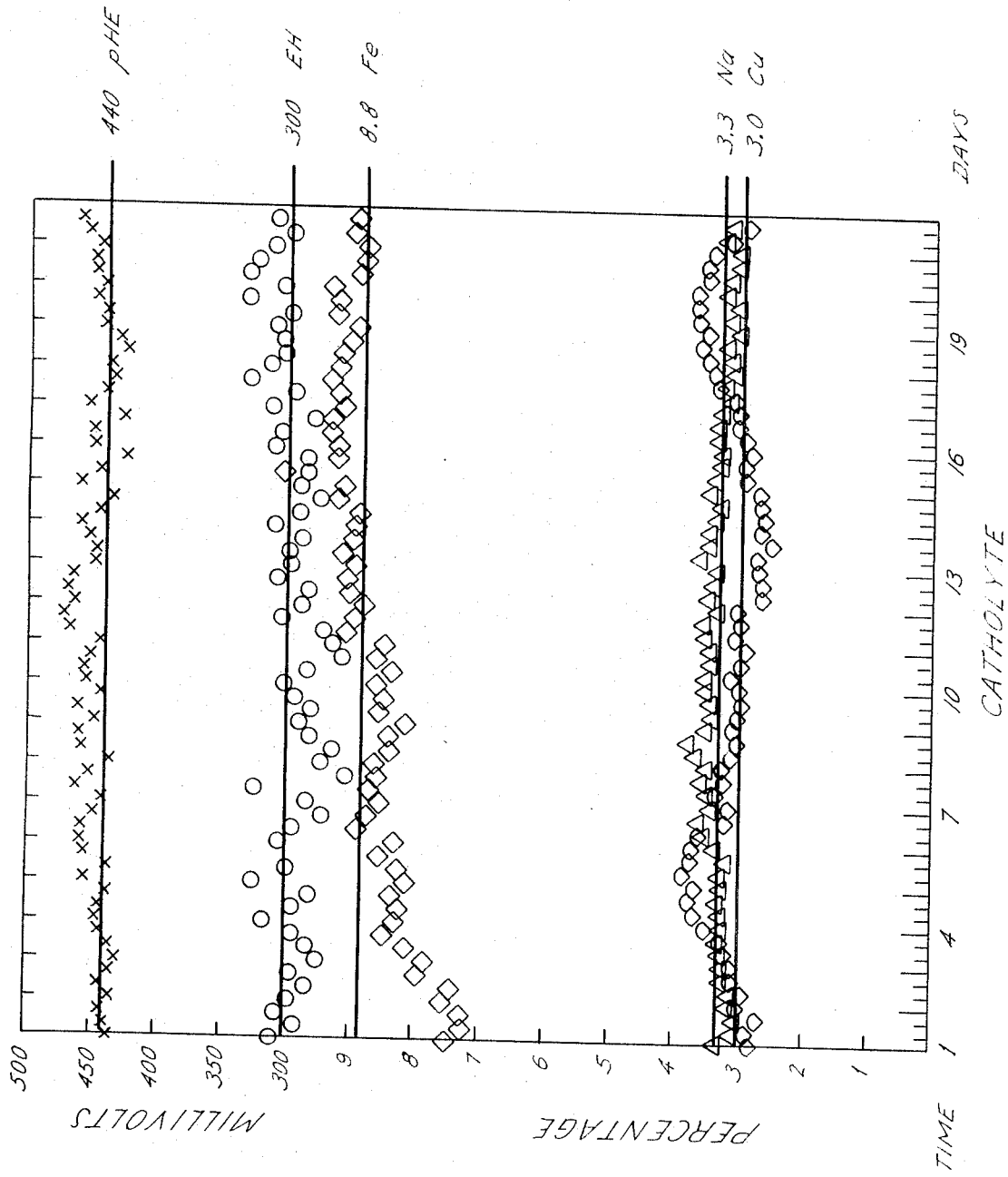
Figure 18:
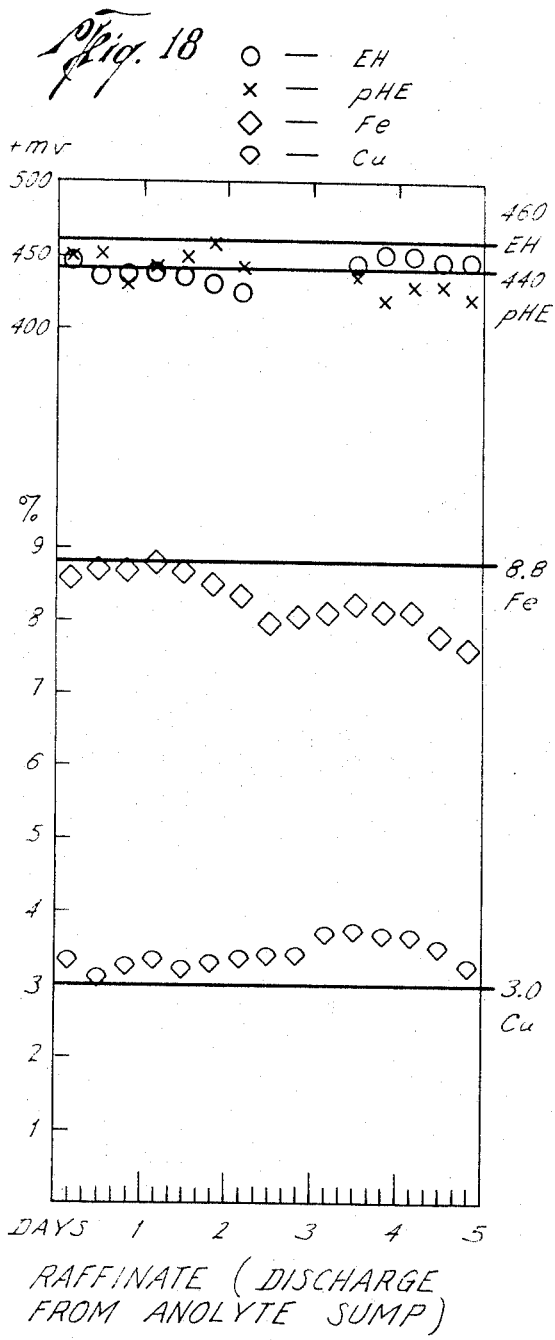
Figure 19:
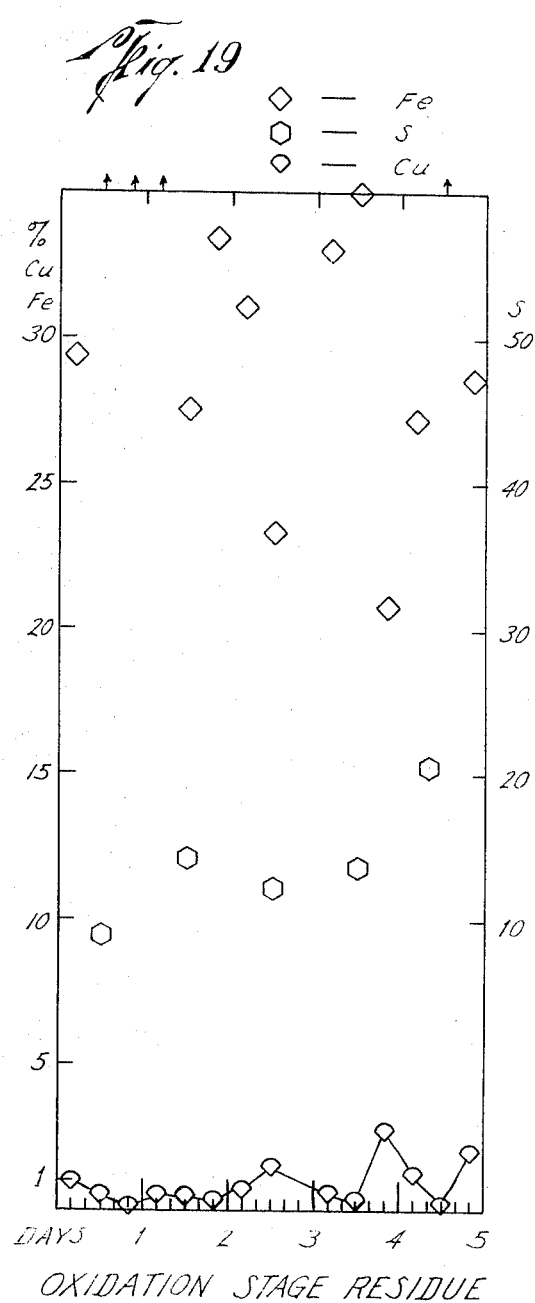

Data for the oxidation and reduction stages obtained from laboratory "loop" tests are presented graphically in FIG. 5. Loop tests are cyclic tests in which the four process stages of this invention are run batchwise, in sequence, with the liquid-solids separations and respective transfers between stages performed in accordance with the process flow of FIG. 3. It will be understood that this procedure provides for recycle and re-use of the process solutions in simulation of continuous flow operations.

It will be noted that the data presented are for the reduction stage, step A, and the oxidation stage, and include the oxidation potential "EH" in +millivolts, and also the hydrogen ion potential "pHE" in +millivolts for the discharge solutions. The chemical analyses of these solutions, expressed in percent (%), are also presented. The percent copper in the leached residue is recorded as well as the filtration time as an indication of the filterability of the leached slurry.

The operating conditions for these tests were atmospheric pressure and near the boiling temperature of the process solution (about 107° C.) for both the oxidation and the reduction stages. For tests 1 through 18, the regeneration-purge stage was performed with oxygen at atmospheric pressure and near boiling temperature for six hours; and in tests 19 through 23, air was used under the same conditions of pressure and temperature for twelve hours. The iron precipitate was included with the regenerated solution for use in the oxidation stage, for which eight hours reaction time was provided.

The feed to these tests was copper sulfide flotation concentrates containing, typically 25% copper, principally as chalcopyrite. The copper solubilization, based on the residue copper analyses, during tests 1 through 18 averaged 99.77%, with a range from 99.31% to 99.92%. The results for tests 19 through 23 were equally good or better.

Data from laboratory tests, structured in general accordance with the stoichiometric molar balance of FIG. 2, are presented in Table V as indicative of the influence of reaction time, temperature and pressure on the regeneration-purge stage process.

TABLE V

| Oxidation reagent | Reaction | | | Final solution | | |
|---|---|---|---|---|---|---|
| | Time | Temp., °C. | Pressure [1] | EH [1] +mv. | pHE +mv. | Iron precipitation [2] |
| Oxygen | 30 minutes | 130 | 60 p.s.i.g. | 576 | 389 | 1.09 |
| | | | | 611 | 422 | 1.02 |
| | | | | 626 | 391 | 1.06 |
| | | | | 626 | 390 | 1.00 |
| | | | | [3] 610 | [3] 398 | [3] 1.04 |
| Do | 6 hours | 107 | Atmospheric | 596 | 402 | 1.02 |
| | | | | 606 | 390 | 1.08 |
| | | | | 610 | 396 | 1.05 |
| | | | | 595 | 399 | 0.997 |
| | | | | 625 | 405 | 1.03 |
| | | | | 612 | 403 | 1.00 |
| | | | | [3] 607 | [3] 400 | [3] 1.03 |
| Air | 12 hours | 107 | do | 580 | 421 | 1.02 |
| | | | | 595 | 404 | 0.85 |
| | | | | [3] 588 | [3] 413 | [3] 0.94 |

[1] EH of 600 +mv.=53 Fe$^{+++}$; 1 Fe$^{++}$=98% oxdiation of iron in solution.
[2] Ratio of observed iron precipitation to stoichiometric iron precipitation.
[3] Average.

Selected data obtained from pilot plant operations, in accordance with this invention, under continuous flow conditions are presented in FIGS. 6 through 13 for a period of 21 days. The copper content of the copper sulfide flotation concentrate feed was typically about 25% copper, principally as chalcopyrite. Operating conditions were at atmospheric pressure and near boiling temperature for both the reduction and oxidation stages, with average volumetric retention times of 4.5 hours and 10 hours, respectively. The regeneration-purge stage was conducted with oxygen at 40 p.s.i.g. and 107° C. After the operation had stabilized the copper analyses of the leached residues showed more than 99% solubilization of the copper for a continuous period of twenty days.

Additional selected data, obtained from pilot plant operations in accordance with this invention, under continuous flow conditions as described above but with the oxidation stage conducted at 40 p.s.i.g. and at 140° C. with a volumetric retention time of one hour, are presented in FIGS. 14 through 20 for a period of five days.

The operating procedure for these pilot plant operations did not provide for precipitation of silver prior to electrolysis. Analyses of the cathode copper produced during these periods indicated copper plus silver contents in excess of 99.9%, thus indicating that contaminants other than silver amounted to less than 0.1%.

The data presented in FIGS. 5 through 20 were selected to illustrate the laboratory and pilot plant operation of the process according to this invention when the operation was relatively free of mechanical and materials handling problems. It will be observed that the data charts include the target levels, denoted by solid lines, established for process control purposes.

It will be evident from the foregoing disclosures that the chemistry of the process technically requires no scheduled addition of reagents other than air/oxygen and water. However, practically, the inventory of required reagents in the process solution must be maintained by compensation for vapor or solution losses. Vapor losses (HCl) are held to a minimum by closed reaction vessels, reflux condensers, temperature control, etc. Solution loss, aside from spills, is essentially restricted to that associated with solids discharged from the process. This can be controlled by washing which, however, must be restricted to avoid dilution of the process solution. The required reagents for make-up are chloride and sodium. Sodium is furnished as sodium chloride. Additional chloride ion as required can be introduced as chlorine gas into the process solution for the additional beneficial effect of its oxidizing power.

The practice of this invention is not limited to the use of any special equipment. The stages and process steps described herein may be conducted on a batch or continuous basis and in any appropriate conventional equipment, including for example, reactors, containers and vessels which may be made open or closed to the atmosphere by conventional means. Moreover, each stage or step as described herein may be conducted in one or more reactors, vessels or containers. Further, the use of available compartmented, divided or segmented units of equipment is within the contemplation of this invention.

We claim:

1. A hydrometallurgical process for the production of metallic copper comprising an oxidation stage in which materials containing copper sulfide ore concentrates are oxidized in a solution containing ferric chloride and cupric chloride until there is substantial solubilization of the copper content of said materials in the form of cupric chloride, a reduction stage separate from the oxidation stage in which at least a substantial portion of the cupric chloride in the solution from the oxidation stage is reduced to cuprous chloride, an electrolysis stage in which metallic copper is recovered and cupric chloride is regenerated by electrolysis of the cuprous chloride solution from the reduction stage, and a regeneration-purge stage separate from the reduction and electrolysis stages in which the ferrous chloride in the solution from the electrolysis stage is reacted with oxygen in the presence of the regenerated cupric chloride to regenerate the ferric chloride required in the oxidation stage and to precipitate, by hydrolysis, compounds including those having the iron-sulfate ratios of jarosite to thereby remove excess iron as well as sulfate ions and other impurities present in the solution.

2. The process of claim 1 in which cupric chloride in the reduction stage is reduced to cuprous chloride by reaction with copper-containing materials.

3. The process of claim 1 in which a substantial portion of the cupric chloride is reduced to cuprous chloride in the reduction stage by reaction with copper sulfide ore concentrates.

4. The process of claim 3 in which the oxidation stage is conducted on materials which include copper sulfide ore concentrates previously reacted with cupric chloride in the reduction stage.

5. The process of claim 1 in which said materials consist primarily of copper-iron sulfide ore concentrates.

6. The process of claim 1 in which said materials consist primarily of chalcopyrite ore concentrates.

7. The process of claim 1 in which a saline metal chloride selected from the group consisting of sodium chloride, potassium chloride, magnesium chloride and mixtures thereof, is maintained present in the solution throughout the process in a concentration sufficient to avoid precipitation of any cuprous chloride in the solution.

8. The process of claim 7 in which the saline metal chloride is sodium chloride.

9. The process of claim 1 in which sodium chloride is maintained present in the solution throughout the process in a concentration near the maximum permitted by its solubility in the solution.

10. The process of claim 1 in which the reaction temperature in the oxidation stage is maintained at about 107° C.

11. The process of claim 10 in which the oxidation stage is closed to the atmosphere to minimize the loss of chloride vapor.

12. The process of claim 1 in which the reaction temperature in the oxidation stage is maintained above the melting point of sulfur and below the temperature at which the viscosity of sulfur rises abruptly, in order to accelerate the reaction rate to produce a reaction slurry containing sulfur released from the sulfide ore concentrates substantially in elemental form.

13. The process of claim 12 in which the sulfur in the finally reacted slurry of the oxidation stage is crystallized by cooling the slurry to a temperature below the melting point of sulfur so as to cause the crystallization of the sulfur into a form that will improve subsequent liquid-solids separation.

14. The process of claim 12 in which the finally reacted slurry of the oxidation stage is subjected to a phase separation, said phase separation comprising separating the aqueous solution, which includes the cupric chloride, from the molten sulfur and the insoluble residues, and thereafter further separating the insoluble residues from the molten sulfur for the ultimate recovery of elemental sulfur.

15. The process of claim 1 in which the reaction temperature in the oxidation stage is maintained in the range from about 107° C. to about 159° C.

16. The process of claim 15 in which the reaction temperature in the oxidation stage is maintained at about 140° C.

17. The process of claim 1 in which the cupric chloride is substantially reduced to cuprous chloride by reaction with fresh chalcopyrite ore concentrates.

18. The process of claim 17 in which the substantially reduced cupric chloride solution is further reacted with a reducing material selected from the group consisting of metallic iron, sodium sulfite, sulfur dioxide, materials containing metallic copper and mixtures thereof in an amount required to reduce essentially all the cupric chloride to cuprous chloride.

19. The process of claim 18 in which the reducing material contains metallic copper.

20. The process of claim 18 in which the reducing material contains metallic iron.

21. The process of claim 17 in which the reduction stage is conducted in the presence of sodium chloride in the process solution and the reaction temperature in the reduction stage is maintained at about 107° C., with said reduction reaction being closed to the atmosphere to minimize the loss of chloride vapor, whereby substantial reduction of the cupric chloride to cuprous chloride is achieved with minimal loss of copper from the solution.

22. The process of claim 21 in which the oxidation stage is conducted on materials containing partially reacted chalcopyrite ore concentrates from the reduction stage.

23. The process of claim 21 in which the substantially reduced cupric chloride solution is further reacted with materials containing metallic copper to form cuprous chloride.

24. The process of claim 1 in which the cuprous chloride solution is electrolyzed at a temperature in the range between about 30° C. and about 60° C.

25. The process of claim 1 in which the metallic copper produced at the cathodes is not more than about one-half the cuprous copper in the cuprous chloride solution feed to the electrolytic cells, thus providing for the oxidation of the remaining cuprous copper to cupric chloride, and avoiding the oxidation of ferrous chloride to ferric chloride.

26. The process of claim 25 in which the solution in contact with the anodes in the electrolytic cells is maintained physically separated from the solution in contact with the cathodes by diaphragms formed of material substantially inert to the environment of the electrolysis and having limited permeability to hydraulic flow together with minimal electrical resistance, and in which each said solution is mixed to maintain homogeneity.

27. The process of claim 1 in which said reaction with oxygen in the regeneration-purge stage is performed at a pressure between about atmospheric pressure and about 60 p.s.i.g. and at a temperature between about 107° C. and about 130° C. to provide a precipitate having physical characteristics for satisfactory subsequent liquid solids separation.

28. The process of claim 1 in which the oxidation is performed at about 107° C. to provide a precipitate having physical characteristics for satisfactory subsequent liquid solids separation.

29. The process of claim 1 in which the compounds precipitated in the regeneration-purge stage are separated from the regenerated ferric chloride solution prior to the transfer of the solution to the oxidation stage.

30. The process of claim 1 in which the compounds precipitated in the regeneration-purge stage are transferred with the regenerated ferric chloride solution to the oxidation stage.

31. The process of claim 1 in which the oxidation and regeneration-purge stages are performed separately.

32. A hydrometallurgical process for the recovery of electrolytic copper from copper ore concentrates containing chalcopyrite and from materials containing metallic copper, comprising a reduction stage having a first step in which said concentrates are introduced into a solution containing cupric chloride to solubilize part of the copper in said concentrates and to reduce part of said cupric chloride in said solution to cuprous chloride, with separation of solids from the solution, and a second step in which the solution is reacted with the materials containing metallic copper to reduce essentially all of the remaining cupric chloride in said solution to cuprous chloride, with concurrent solubilization of the reacted metallic copper in the form of cuprous chloride; a copper recovery stage in which the cuprous chloride solution is electrolyzed to produce metallic copper at the cathodes and to regenerate cupric chloride at the anodes; a regeneration-purge stage in which the raffinate from the electrolysis is reacted with oxygen to form ferric chloride with concurrent purge of the excess iron as well as sulfate ions and other impurities; and an oxidation stage in which the solids from the first step of the reduction stage are oxidized in the solution containing ferric chloride to solubilize essentially all remaining copper in the solids in the form of cupric chloride, and recycling the solution containing cupric chloride to the reduction stage.

33. The process of claim 32 in which the materials containing metallic copper consist primarily of cement copper.

34. The process of claim 32 in which the materials containing metallic copper consist primarily of scrap copper.

35. A hydrometallurgical process for the production of metallic copper comprising:
(A) oxidizing materials containing principally chalcopyrite ore concentrates in containers essentially closed to the atmosphere with a solution containing ferric chloride and cupric chloride, using a molar ratio of the ferric chloride to the chalcopyrite in the materials of at least about 4 to 1, at a temperature between about 107° C. and about 159° C., for such a period of time as to achieve substantial solubilization of the copper content of the materials, thereby forming a solution containing cupric chloride and ferrous chloride;
(B) partially reducing the cupric chloride in the solution from step (A) by reaction with materials containing principally fresh chalcopyrite ore concentrates in containers essentially closed to the atmosphere at about 107° C.;
(C) contacting the solution from step (B) with metal reducing agents selected from the class consisting of metallic copper, metallic iron and mixtures thereof as required to reduce essentially all the remaining cupric chloride to cuprous chloride, thereby forming a feed solution for electrolysis containing cuprous chloride and ferrous chloride;
(D) electrolyzing in electrolytic cells the cuprous chloride in the feed solution to produce metallic copper in the cathode compartment and to regenerate cupric chloride in the anode compartment; and
(E) reacting with oxygen the ferrous chloride in the spent electrolyte in the presence of regenerated cupric chloride to regenerate ferric chloride for oxidizing said ore concentrates and to precipitate by hydrolysis excess iron as well as sulfate ions and other contaminants.

36. A hydrometallurgical process for the production of metallic copper from cement copper and copper sulfide ore concentrates containing primarily chalcopyrite comprising:
(A) oxidizing the partially reacted copper sulfide ore concentrates from step (D) in containers essentially closed to the atmosphere with a solution containing ferric chloride, cupric chloride and sodium chloride, at a temperature above the temperature at which the sulfur released from the ore liquefies and below the temperature at which the viscosity of the said liquid sulfur increases abruptly, for such a period of time as to solubilize substantially all the copper from the ore, thereby forming a slurry containing solids, sulfur, cupric chloride, ferrous chloride and sodium chloride;
(B) separating the sulfur and the solids in the slurry formed in step (A) from the solution containing cupric chloride, ferrous chloride and sodium chloride;
(C) partially reducing the cupric chloride in the solution from step (B) by reaction with fresh copper sulfide ore concentrates in containers essentially closed to the atmosphere at about 107° C., thereby forming a slurry containing partially reacted copper sulfide ore concentrates, ferrous chloride, sodium chloride, cuprous chloride and cupric chloride;
(D) separating from the slurry formed in step (C) the solution containing ferrous chloride, sodium chloride, cuprous chloride and cupric chloride, and transferring the remaining partially reacted copper sulfide ore concentrates to step (A);
(E) reducing essentially all the remaining cupric chloride in the solution from step (D) with cement copper to form feed solution for electrolysis containing ferrous chloride, sodium chloride and cuprous chloride;
(F) electrolyzing in electrolytic cells at a temperature between about 30° C. and about 60° C. the cuprous chloride in the feed solution to produce metallic copper at the cathodes and to regenerate cupric chloride at the anodes; and (G) reacting with oxygen the spent electrolyte in the presence of the regenerated cupric chloride to regenerate ferric chloride for use in step (A) and to precipitate by hydrolysis excess iron as well as sulfate ions and other contaminants from the solution.

References Cited

UNITED STATES PATENTS

| 3,692,647 | 9/1972 | Chambers et al. | 204—107 |
| 1,570,777 | 6/1926 | Pike | 75—104 |
| 2,273,036 | 2/1942 | Heise et al. | 204—107 |

FOREIGN PATENTS

| 13,499 | 6/1912 | Great Britain | 204—107 |
| 5,336 | 6/1880 | Great Britain | 75—111 |
| 4,626 | 3/1889 | Great Britain | 204—107 |
| 15,849 | 7/1912 | Great Britain | 75—104 |
| 276,008 | 8/1927 | Great Britain | 75—114 |

OSCAR R. VERTIZ, Primary Examiner

J. COOPER, Assistant Examiner

U.S. Cl. X.R.

75—104, 114, 117

UNITED STATES PATENT OFFICE
CERTIFICATE OF CORRECTION

Patent No. 3,785,944     Dated January 15, 1974

Inventor(s) George E. Atwood and Charles H. Curtis

It is certified that error appears in the above-identified patent and that said Letters Patent are hereby corrected as shown below:

Col. 1, lines 55-56, "chalocopyrite" should be -- chalcopyrite --

Col. 3, line 54, delete "is" (first appearance)

Col. 4, line 72, "FIG" should be -- FIGS --

Col. 5, line 4, "material" should be -- materials --

Col. 5, line 18, "step 1" should be -- stage 1 --

Col. 7, line 2, add -- step -- following the word "first"

Col. 11, line 74, delete "oxygen" (first appearance)

Col. 12, line 16, Table I, "discahrge" should be -- discharge --

Col. 14, Table V, Note 1, "oxdiation" should be -- oxidation --

Signed and sealed this 23rd day of July 1974.

(SEAL)
Attest:

McCOY M. GIBSON, JR.
Attesting Officer

C. MARSHALL DANN
Commissioner of Patents